(12) United States Patent
Otani

(10) Patent No.: US 12,493,954 B2
(45) Date of Patent: Dec. 9, 2025

(54) MEDICAL IMAGE PROCESSING DEVICE, METHOD FOR OPERATING MEDICAL IMAGE PROCESSING DEVICE, AND PROGRAM

(71) Applicant: FUJIFILM Corporation, Tokyo (JP)

(72) Inventor: Keita Otani, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 376 days.

(21) Appl. No.: 18/152,739

(22) Filed: Jan. 10, 2023

(65) Prior Publication Data

US 2023/0237655 A1    Jul. 27, 2023

(30) Foreign Application Priority Data

Jan. 25, 2022 (JP) ................................. 2022-009514
Apr. 15, 2022 (JP) ................................. 2022-067741

(51) Int. Cl.
*G06K 9/00* (2022.01)
*G06T 7/00* (2017.01)
*G16H 30/40* (2018.01)

(52) U.S. Cl.
CPC ........... *G06T 7/0012* (2013.01); *G16H 30/40* (2018.01); *G06T 2207/20081* (2013.01)

(58) Field of Classification Search
CPC ......... G06T 7/0012; G06T 2207/20081; G06T 2207/10081; G06T 7/11; G06T 2207/20084; G06T 2207/30096; G16H 30/40; G16H 30/20; G16H 40/67; G16H 50/20; G16H 50/30; G16H 50/70
See application file for complete search history.

(56) References Cited

U.S. PATENT DOCUMENTS

| 8,965,086 B2* | 2/2015 | Lee ......................... A61B 6/507 |
| | | 382/128 |
| 10,307,131 B2* | 6/2019 | Taylor ..................... A61B 5/026 |
| 10,349,909 B2* | 7/2019 | Okerlund ............... A61M 5/007 |
| 10,363,008 B2* | 7/2019 | Mensah ................. G06F 18/241 |
| 10,736,583 B2* | 8/2020 | Ichihara ................. G16H 50/30 |
| 10,847,262 B2* | 11/2020 | Izutani ................... G16H 30/40 |

(Continued)

FOREIGN PATENT DOCUMENTS

| JP | 2011136030 | | 7/2011 | |
| JP | 2014023607 A | * | 2/2014 | ............. A61B 6/507 |
| JP | 2016097077 A | * | 5/2016 | ............ A61B 6/4441 |

OTHER PUBLICATIONS

Koichiro Yasaka et al., "Deep Learning with Convolutional Neural Network for Differentiation of Liver Masses at Dynamic Contrast enhanced CT: A Preliminary Study," Radiology, vol. 286, Mar. 2018, pp. 887-896.

*Primary Examiner* — Shervin K Nakhjavan
(74) *Attorney, Agent, or Firm* — JCIPRNET

(57) ABSTRACT

Provided are a medical image processing device, a method for operating a medical image processing device, and a program that achieve stable performance in property analysis on a medical image using a contrast state.
A medical image generated by performing contrast imaging is acquired, a contrast state of the medical image is estimated on the basis of analysis on the medical image, and a property analysis is performed on a region of interest included in the medical image on the basis of features of the region of interest, using contrast state information indicating the contrast state of the medical image.

9 Claims, 17 Drawing Sheets

(56) References Cited

U.S. PATENT DOCUMENTS

| | | | | |
|---|---|---|---|---|
| 10,925,565 | B2* | 2/2021 | Sahbaee Bagherzadeh | A61B 6/504 |
| 11,170,890 | B2* | 11/2021 | Unser | A61B 6/507 |
| 11,227,683 | B2* | 1/2022 | Morard | G06T 7/0014 |
| 11,369,278 | B2* | 6/2022 | Ma | A61B 5/1073 |
| 11,452,490 | B2* | 9/2022 | Vaz | A61B 6/501 |
| 11,568,174 | B2* | 1/2023 | Harrison | G06V 20/64 |
| 11,727,087 | B2* | 8/2023 | Muhamedrahimov | G06N 3/08 |
| | | | | 382/131 |
| 11,769,252 | B2* | 9/2023 | Chien | A61B 5/026 |
| | | | | 382/128 |
| 11,826,201 | B2* | 11/2023 | Errico | G06N 3/047 |
| 11,911,201 | B2* | 2/2024 | Yao | G06T 7/246 |
| 11,995,831 | B2* | 5/2024 | Szczykutowicz | A61M 5/007 |
| 12,020,429 | B2* | 6/2024 | Gordon | G06T 7/10 |
| 2017/0178338 | A1* | 6/2017 | Yang | G06T 7/0016 |
| 2018/0071452 | A1* | 3/2018 | Sharma | A61M 5/007 |
| 2023/0091196 | A1* | 3/2023 | Ohyu | G06T 5/90 |
| | | | | 345/592 |
| 2023/0225709 | A1* | 7/2023 | Yoshiara | G06T 7/0012 |
| | | | | 600/458 |
| 2023/0298149 | A1* | 9/2023 | Ichihashi | G06T 5/50 |
| | | | | 382/133 |
| 2025/0104239 | A1* | 3/2025 | Mysore Siddu | G06T 7/0016 |

* cited by examiner

MEDICAL IMAGE PROCESSING DEVICE, METHOD FOR OPERATING MEDICAL IMAGE PROCESSING DEVICE, AND PROGRAM

CROSS-REFERENCE TO RELATED APPLICATION

The present application claims priorities under 35 U.S.C § 119(a) to Japanese Patent Application No. 2022-009514 filed on Jan. 25, 2022 and Japanese Patent Application No. 2022-067741 filed on Apr. 15, 2022, each of which is hereby expressly incorporated by reference, in its entirety, into the present application.

BACKGROUND OF THE INVENTION

1. Field of the Invention

The present invention relates to a medical image processing device, a method for operating a medical image processing device, and a program.

2. Description of the Related Art

An imaging method called dynamic contrast-enhanced CT, which is a combination of angiography using a contrast agent and X-ray CT, is known. For example, in the dynamic contrast-enhanced CT of the liver, a plurality of imaging operations having different contrast time phases are performed while injecting a contrast agent to acquire CT images, and the transformation of the enhanced state of a lesion in the CT images is observed. In addition, CT is an abbreviation of Computed Tomography.

JP2011-136030A discloses an image determination device that automatically determines whether or not an image is a contrast image or a non-contrast image. The device disclosed in JP2011-136030A detects a region of a first part which is not affected by a contrast agent from acquired image data, specifies a region of a second part which has a predetermined relative positional relationship with the first part and is affected by the contrast agent, and determines whether or not the image data has been obtained by contrast imaging according to whether or not a CT value of the second region is equal to or greater than a predetermined value.

Yasaka K, Akai H, Abe O, Kiryu S. Deep Learning with Convolutional Neural Network for Differentiation of Liver Masses at Dynamic Contrast-enhanced CT: A Preliminary Study. Radiology. 2018 March; 286(3):887-896. doi: 10.1148/radiol.2017170706. Epub 2017 Oct. 23. PMID: 29059036. discloses a deep learning model that is applied to classify a lesion of a liver tumor. The deep learning model disclosed in Yasaka K, Akai H, Abe O, Kiryu S. Deep Learning with Convolutional Neural Network for Differentiation of Liver Masses at Dynamic Contrast-enhanced CT: A Preliminary Study. Radiology. 2018 March; 286(3):887-896. doi: 10.1148/radiol.2017170706. Epub 2017 Oct. 23. PMID: 29059036. receives, as an input image, an image obtained by cutting out a tumor region from an image, in which contrast time phases of non-contrast, an arterial phase, and an equilibrium phase are known, and outputs classification of five lesions of classic hepatocellular carcinoma, malignant tumor other than hepatocellular carcinoma, benign tumor, hemangioma, and cyst. In addition, the benign tumor includes an image in which it is not possible to distinguish between a benign tumor and a malignant tumor.

SUMMARY OF THE INVENTION

However, even in the images captured at the same time elapsed since the start of the injection of the contrast agent, the contrast state may differ depending on, for example, the physique of a subject and the physical condition of the subject. Therefore, in a case in which the contrast time phase is determined using information of the injection start time of the contrast agent included in metadata and property analysis is performed, the performance of the property analysis may deteriorate due to a variation in the contrast time phase.

In addition, in a case in which the metadata does not include the information of the injection start time of the contrast agent, the property analysis is performed in a state in which the contrast time phase is not determined.

A system disclosed in JP2011-136030A determines whether or not the acquired image data has been obtained by contrast imaging, and it is difficult to determine the contrast time phase of the captured image.

In the method disclosed in Yasaka K, Akai H, Abe O, Kiryu S. Deep Learning with Convolutional Neural Network for Differentiation of Liver Masses at Dynamic Contrast-enhanced CT: A Preliminary Study. Radiology. 2018 March; 286(3):887-896. doi: 10.1148/radiol.2017170706. Epub 2017 Oct. 23. PMID: 29059036, the contrast time phase is known. In addition, it is not possible to respond to a case in which there is no information related to the variation in the contrast time phase affected by, for example, the physique and the like of the subject and the specification of the contrast time phase.

The invention has been made in view of these circumstances, and an object of the invention is to provide a medical image processing device, a method for operating a medical image processing device, and a program that achieve stable performance in property analysis on a medical image using a contrast state.

According to a first aspect, there is provided a medical image processing device comprising: one or more processors; and one or more memories that store a program to be executed by the one or more processors. The one or more processors execute commands of the program to acquire a medical image generated by performing contrast imaging, to estimate a contrast state of the medical image on the basis of an analysis of the medical image, and to perform a property analysis on a region of interest included in the medical image, using contrast state information indicating the contrast state of the medical image.

According to the medical image processing device of the first aspect, image analysis is performed on the medical image generated by performing the contrast imaging to estimate the contrast state, and the property analysis is performed on the region of interest included in the medical image using the estimated contrast state. Therefore, the deterioration of the performance of the property analysis caused by a variation in the contrast state is suppressed, and stable performance can be achieved in the property analysis on the medical image using the contrast state. In addition, even in a case in which the medical image does not have information specifying the contrast state, the property analysis can be performed on the medical image using the contrast state.

An example of the estimation of the contrast state is the estimation of the contrast time phase. The contrast state may include non-contrast.

According to a second aspect, in the medical image processing device according to the first aspect, the one or more processors may select the medical image using the contrast state information.

According to this aspect, a medical image corresponding to the contrast state suitable for the property analysis can be selected.

According to a third aspect, in the medical image processing device according to the second aspect, the one or more processors may select the medical image having contrast state information suitable for the property analysis.

According to this aspect, the application of the medical image, which is not suitable for the property analysis, to the property analysis is suppressed. Therefore, the performance of the property analysis can be stabilized.

According to a fourth aspect, in the medical image processing device according to the second or third aspect, the one or more processors may select the medical image according to the property analysis on an input image.

According to this aspect, an input image for the property analysis corresponding to the limitation of the input image in the property analysis can be selected.

According to a fifth aspect, in the medical image processing device according to any one of the second to fourth aspects, the one or more processors may select the medical image for each contrast state information item corresponding to each of predetermined two or more types of contrast states.

According to this aspect, even in a case in which the contrast state suitable for the property analysis is limited, it is possible to select a medical image corresponding to the contrast state suitable for the property analysis.

According to a sixth aspect, in the medical image processing device according to any one of the second to fifth aspects, the one or more processors may select the medical image having contrast state information corresponding to a contrast state excluding non-contrast.

According to this aspect, even in a case in which the property analysis that is not suitable for the non-contrast is applied, it is possible to select a medical image corresponding to the contrast state suitable for the property analysis.

According to a seventh aspect, in the medical image processing device according to any one of the first to sixth aspects, the one or more processors may extract the region of interest from the acquired medical image and perform the property analysis on the region of interest.

According to this aspect, even in a case in which the medical image in which the region of interest has not been extracted is acquired, the property analysis can be performed on the region of interest.

According to an eighth aspect, in the medical image processing device according to any one of the first to seventh aspects, the one or more processors may estimate the contrast state of the acquired medical image using a trained learning model.

According to this aspect, the improvement of the accuracy of estimating the contrast state is expected.

A deep learning model, such as a neural network, is given as an example of the trained learning model.

According to a ninth aspect, in the medical image processing device according to any one of the first to eighth aspects, the one or more processors may perform the property analysis on the region of interest included in the acquired medical image using a trained learning model.

According to this aspect, it is possible to improve the accuracy of the property analysis.

According to a tenth aspect, in the medical image processing device according to the ninth aspect, the one or more processors may extract feature amounts from the regions of interest included in the medical images for each contrast state, using the trained learning model, and perform the property analysis on the regions of interest included in the medical images on the basis of feature data in which the feature amounts of the regions of interest for each contrast state are concatenated.

According to this aspect, it is possible to perform the property analysis considering the features of the regions of interest included in the medical images of a plurality of contrast states.

According to an eleventh aspect, in the medical image processing device according to the tenth aspect, the one or more processors may extract the feature amounts from the regions of interest included in the medical images for each contrast state, using a feature extraction model that extracts the feature amounts from the regions of interest included in the medical images for each contrast state as the trained learning model, concatenate the feature amounts of the regions of interest included in the medical images for each contrast state, and perform the property analysis on the regions of interest included in the medical images, using a classification model that classifies the feature data in which the feature amounts of the regions of interest included in the medical images for each contrast state are concatenated as the trained learning model.

According to this aspect, it is possible to perform the extraction of the feature amount and the property analysis, using the individual trained learning model for each process.

According to a twelfth aspect, in the medical image processing device according to the eleventh aspect, the one or more processors may average some of the feature amounts of the regions of interest included in the medical images for each contrast state.

According to this aspect, a processing load in a case in which the feature amounts of the regions of interest included in the medical images for each contrast state are concatenated is reduced.

According to a thirteenth aspect, in the medical image processing device according to the twelfth aspect, the one or more processors may calculate a weight for each of the feature amounts of the regions of interest included in the medical images for each contrast state, using a weight calculation model that calculates the weight used in a case in which a weighted average of the feature amounts of the regions of interest included in the medical images for each contrast state is calculated as the trained learning model.

According to this aspect, it is possible to estimate the contribution of the regions of interest included in the medical images for each contrast state in the property analysis.

According to a fourteenth aspect, in the medical image processing device according to the tenth aspect or the eleventh aspect, in a case in which some of the regions of interest included in the medical images for each contrast state are lost, the one or more processors may use the region of interest included in the medical image of the contrast state, which has a similar feature amount to the region of interest included in the medical image of the lost contrast state, instead of the region of interest included in the medical image of the lost contrast state.

According to this aspect, even in a case in which the regions of interest in some of the contrast states are lost, it is possible to perform the property analysis on the region of interest included in the medical image based on the contrast state.

According to a fifteenth aspect, there is provided a method for operating a medical image processing device to which a computer is applied. The method comprises: causing the medical image processing device to acquire a medical image generated by performing contrast imaging; causing the medical image processing device to estimate a contrast state of the medical image on the basis of an analysis of the medical image; and causing the medical image processing device to perform a property analysis on a region of interest included in the medical image, using contrast state information indicating the contrast state of the medical image.

According to the method for operating a medical image processing device of the fifteenth aspect, it is possible to obtain the same operation and effect as those of the medical image processing device according to the present disclosure. Components of a medical image processing device according to another aspect can be applied to components of a method for operating a medical image processing device according to another aspect.

According to a sixteenth aspect, there is provided a program that causes a computer to implement: a function of acquiring a medical image generated by performing contrast imaging; a function of estimating a contrast state of the medical image on the basis of an analysis of the medical image; and a function of performing a property analysis on a region of interest included in the medical image, using contrast state information indicating the contrast state of the medical image.

According to the program of the sixteenth aspect, it is possible to obtain the same operation and effect as those of the medical image processing device according to the present disclosure. Components of a medical image processing device according to another aspect can be applied to components of a program according to another aspect.

According to the present invention, image analysis is performed on a medical image generated by performing contrast imaging to estimate a contrast state, and property analysis is performed on a region of interest included in the medical image using the estimated contrast state. Therefore, the deterioration of the performance of the property analysis caused by a variation in the contrast state is suppressed, and stable performance can be achieved in the property analysis on the medical image using the contrast state. In addition, even in a case in which the medical image does not have information specifying the contrast state, the property analysis can be performed on the medical image using the contrast state.

DESCRIPTION OF THE PREFERRED EMBODIMENTS

Figure 1:
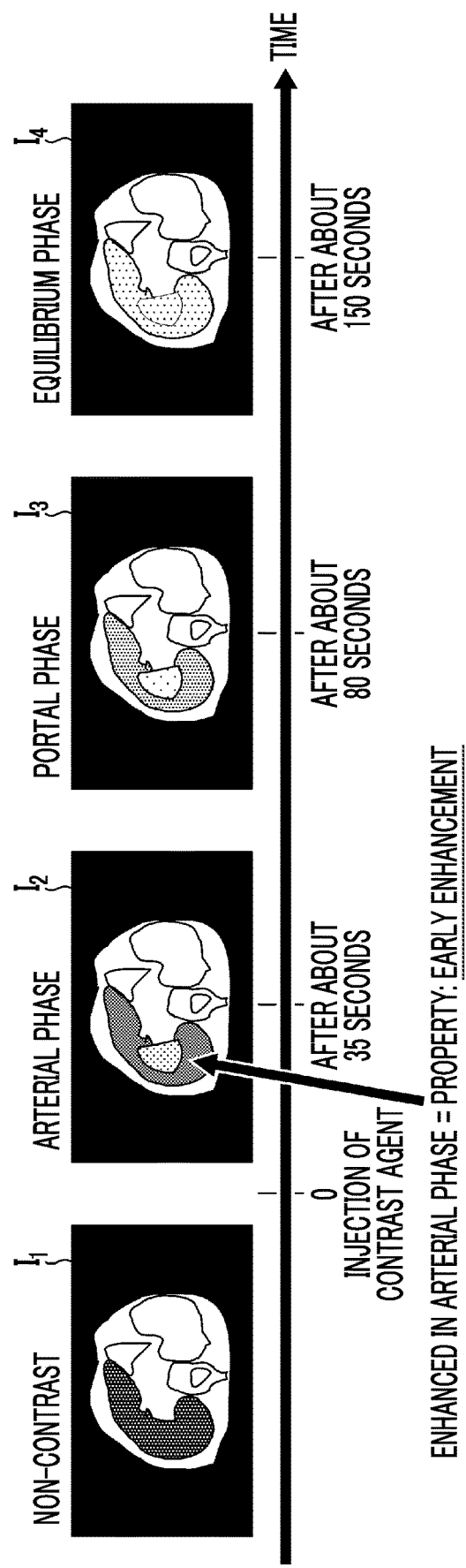
FIG. 1 is a diagram illustrating dynamic contrast-enhanced CT.

Hereinafter, preferred embodiments of the invention will be described in detail with reference to the accompanying drawings. In the specification, the same components are denoted by the same reference numerals, and the duplicate description thereof will be appropriately omitted.

For Dynamic Contrast-Enhanced CT

FIG. 1 is a diagram illustrating dynamic contrast-enhanced CT. FIG. 1 schematically illustrates CT images for each contrast time phase captured by applying dynamic contrast-enhanced CT. The dynamic contrast-enhanced CT is a method that injects a contrast agent, such as an iodinated contrast agent, into a vein of an arm, repeatedly images the same part a plurality of times, and observes a change in a CT image over time.

That is, the dynamic contrast-enhanced CT is an imaging method that images an organ a plurality of times at a timing when the hemodynamics of the organ are conscious. The imaging timing is determined according to the organ. For example, in the imaging of the liver, imaging is performed at a timing when the hemodynamics of the liver are conscious. In addition, in the dynamic contrast-enhanced CT, imaging may be performed before the start of the injection of the contrast agent to acquire a non-contrast CT image similar to that of simple CT.

FIG. 1 illustrates a non-contrast CT image $I_1$, an arterial phase CT image $I_2$, a portal phase CT image $I_3$, and an equilibrium phase CT image $I_4$. In FIG. 1, any one slice image of a slice image group including a plurality of slice images in each contrast time phase is illustrated as the CT image.

A lateral axis illustrated in FIG. 1 is a time axis on which the injection start time of the contrast agent is 0 seconds, and the unit of the time axis is seconds. FIG. 1 illustrates the arterial phase CT image $I_2$ captured about 35 seconds after the injection of the contrast agent, the portal phase CT image $I_3$ captured about 80 seconds after the injection of the contrast agent, and the equilibrium phase CT image $I_4$ captured about 150 seconds after the injection of the contrast agent.

The appearance of tumor in the CT image differs depending on a difference in the contrast time phase. Therefore, accurate information of the contrast time phase is required for property analysis. In the example illustrated in FIG. 1, there is an enhancement in the arterial phase CT image $I_2$, and the analysis result of the property analysis indicating early enhancement can be obtained.

Here, the term "image" in the specification may include not only the meaning of the image itself but also the meaning of image data which is a signal indicating the image. In addition, the term "injection start time" may be read as injection start timing.

Figure 2:
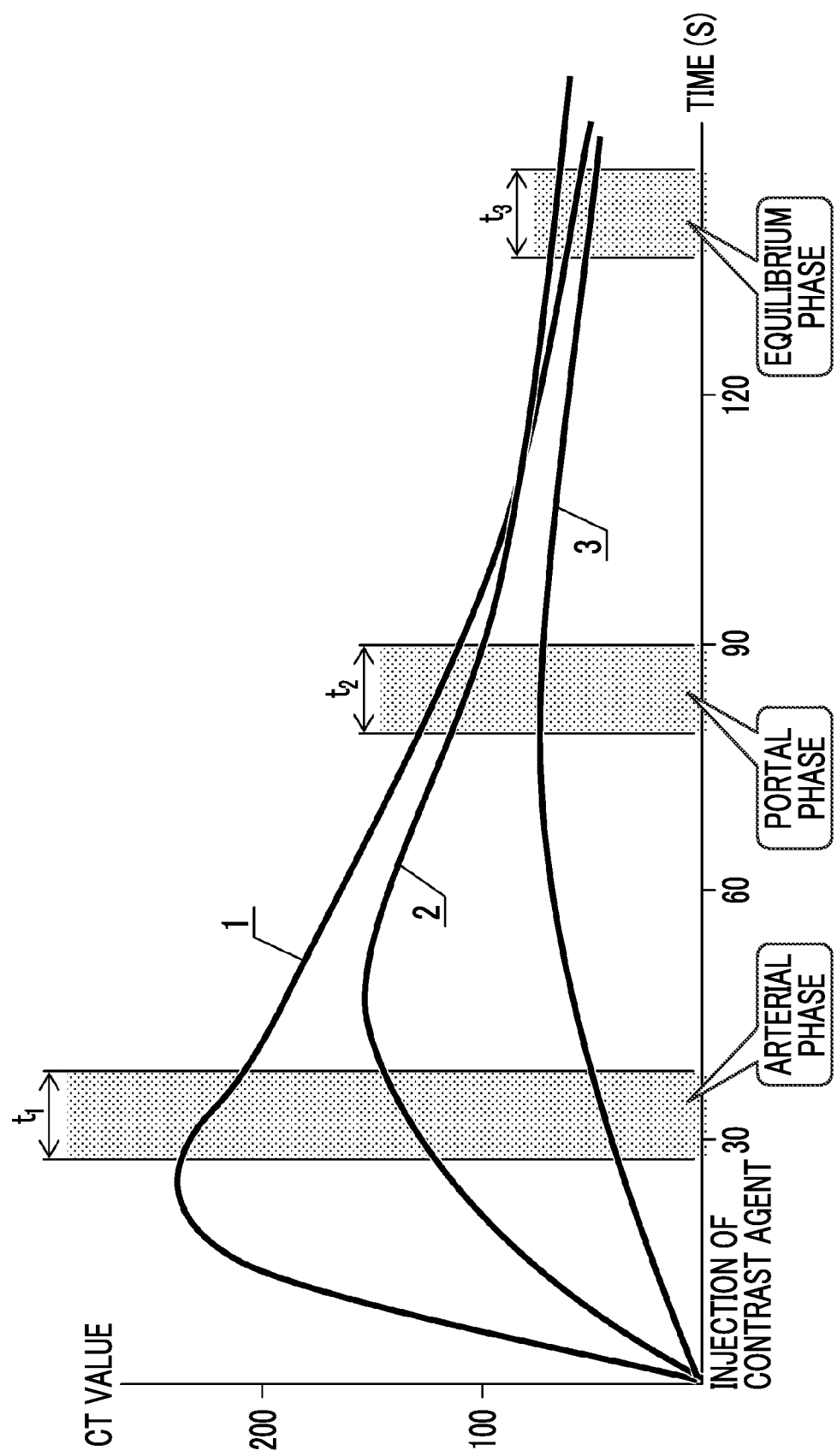
FIG. 2 is a graph illustrating a relationship between a contrast time phase and a CT value.

FIG. 2 is a graph illustrating the relationship between the contrast time phase and a CT value. The lateral axis of the graph illustrated in FIG. 2 is the time axis, and the unit of the time axis is seconds. Further, the vertical axis illustrated in FIG. 2 is a CT value axis. Curve 1 shows a change in the CT value in the artery over time. Curve 2 shows a change in the CT value in the portal vein over time. Curve 3 shows a change in the CT value in the liver over time.

The contrast time phase is a state in which a specific time has elapsed since the injection of the contrast agent. In the dynamic contrast-enhanced CT of the liver, the arterial phase, the portal phase, and the equilibrium phase are defined. For example, the arterial phase indicates a state in which a large amount of contrast agent is flowing to the artery.

The contrast agent injected in the vein reaches the abdominal artery 30 to 40 seconds after the start of the injection. A period $t_1$ illustrated in FIG. 2 corresponds to the arterial phase. In addition, the contrast agent injected into the vein reaches the portal vein 60 to 80 seconds after the start of the injection. A period $t_2$ illustrated in FIG. 2 corresponds to the portal phase. Further, for the contrast agent injected into the vein, the contrast densities in a blood vessel and an extracellular fluid become an equilibrium state 150 to 200 seconds after the start of the injection. This state is the equilibrium phase. A period $t_3$ illustrated in FIG. 2 corresponds to the equilibrium phase.

FIG. 2 illustrates the contrast time phase of the liver, and examples of the contrast time phase of the kidney include a dermal phase, a parenchymal phase, and an excretory phase. Similarly to the liver, the relationship between the contrast time phase and the time elapsed since the injection start time of the contrast agent is defined for the kidney.

Problems of Property Analysis

Property analysis on the CT image captured by the application of the dynamic contrast-enhanced CT requires accurate information of the contrast time phase, and there are problems, such as lack of metadata and a difference in the physique of the subject, in the specification of the contrast time phase.

The lack of the metadata is the lack of the information of the injection start time of the contrast agent in the metadata. In a case in which the information of the injection start time of the contrast agent is lost or damaged in the metadata, it is difficult to specify the time elapsed since the injection start time of the contrast agent. As a result, it is difficult to accurately specify the contrast time phase.

In addition, the difference in the physique of the subject means that the spread of the contrast agent differs depending on a difference in the physique, heart rate, and the like of each subject and it is not possible to accurately specify the contrast time phase on the basis of the time elapsed since the injection start time of the contrast agent even in a case in which the injection start time of the contrast agent is known.

For example, as a blood circulation volume per unit time, such as a cardiac output indicating the volume of blood pumped out per unit time, becomes larger, the arrival time of the contrast agent to an object to be imaged becomes shorter, the maximum CT value becomes smaller, and the time when the CT value reaches the maximum value becomes shorter.

However, it is difficult to understand the blood circulation volume per unit time in advance, and the blood circulation volume per unit time is likely to increase due to, for example, the tension of the subject during an examination, as compared to a resting state. In a case in which the blood circulation volume per unit time varies in this way, the movement time of the contrast agent may also vary.

Hereinafter, a property analysis device will be described which acquires accurate information of the contrast time phase in which the influence of the variation in the movement time of the contrast agent caused by, for example, the physique of the subject is suppressed, without depending on the information of the injection start time of the contrast agent in the metadata and performs property analysis using the information of the contrast time phase.

Property Analysis Device According to First Embodiment

Figure 3:
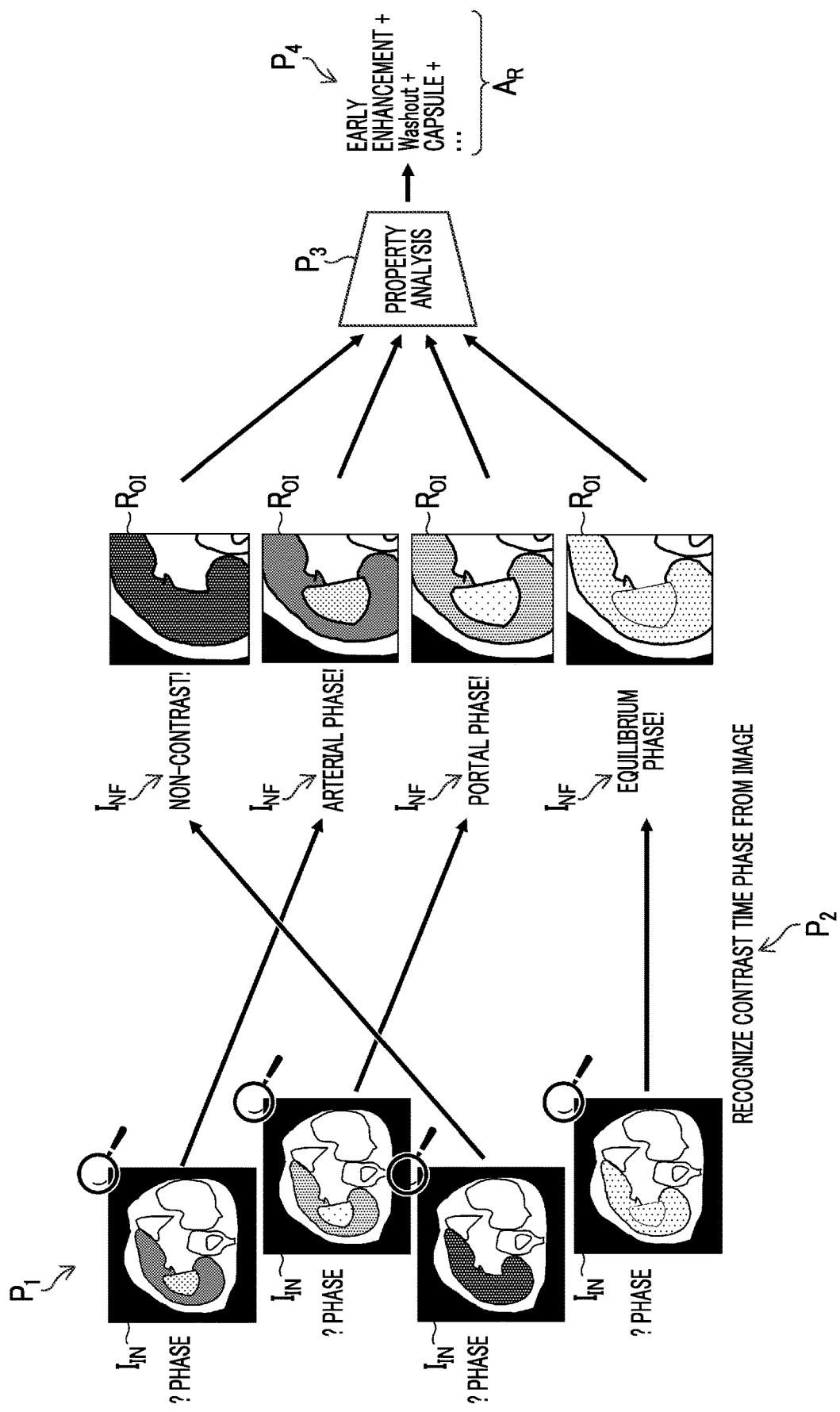
FIG. 3 is a conceptual diagram illustrating an outline of a process applied to a property analysis device according to a first embodiment.

FIG. 3 is a conceptual diagram illustrating an outline of a process applied to a property analysis device according to a first embodiment. In the process applied to the property analysis device illustrated in FIG. 3, in a CT image acquisition process $P_1$, three-dimensional CT data captured by applying the dynamic contrast-enhanced CT is acquired.

FIG. 3 schematically illustrates the three-dimensional CT data acquired in the CT image acquisition process $P_1$ as a two-dimensional CT image $I_{IN}$. Hereinafter, the term "CT image $I_{IN}$" can be read as three-dimensional CT data.

In the CT image acquisition process $P_1$, the CT image $I_{IN}$ in which the contrast time phase is not specified is acquired. In the CT image acquisition process $P_1$, the CT image $I_{IN}$ is acquired from a storage device in which medical images are stored.

FIG. 3 illustrates an example in which four types of CT images $I_{IN}$ acquired before the start of the injection of the contrast agent, $t_1$ seconds after the start of the injection of the contrast agent, $t_2$ seconds after the start of the injection of the contrast agent, and $t_3$ seconds after the start of the injection of the contrast agent illustrated in FIG. 1 are acquired. The CT image $I_{IN}$ is any one CT image in a CT image group including a plurality of CT images acquired $t_i$ seconds after the start of the injection of the contrast agent. In addition, "i" indicates the number of times imaging is performed in time series, and an integer equal to or greater than 1 is applied. Further, the CT images $I_{IN}$ illustrated in FIG. 3 include a non-contrast CT image.

In a contrast time phase estimation process $P_2$, image analysis is performed on each of the CT images $I_{IN}$ acquired in the CT image acquisition process $P_1$ to estimate the contrast time phase, and contrast time phase information $I_{NF}$ is acquired for each CT image $I_{IN}$. The image analysis referred to here may include the meaning of a process using pixel values of pixels constituting the image. In addition, the acquisition of the contrast time phase information $I_{NF}$ may include the meaning of the generation of the contrast time phase information $I_{NF}$.

For the CT image $I_{IN}$ in which the contrast time phase has been estimated, a property analysis process $P_3$ is performed on a region of interest $R_{OI}$ using the contrast time phase information $I_{NF}$ corresponding to the estimated contrast time phase, and an information output process $P_4$ is performed to output an analysis result $A_R$. FIG. 3 illustrates early enhancement, washout, and a capsule as the analysis result $A_R$ of the property analysis.

In the CT image acquisition process $P_1$ illustrated in FIG. 3, any one slice image included in a plurality of slice images sampled at equal intervals from three-dimensional CT data of a patient captured by a CT apparatus is acquired as the CT image $I_{IN}$. In addition, the slice image may be paraphrased as a tomographic image. That is, the slice image may be understood as a tomographic image that is substantially a two-dimensional image.

Figure 4:
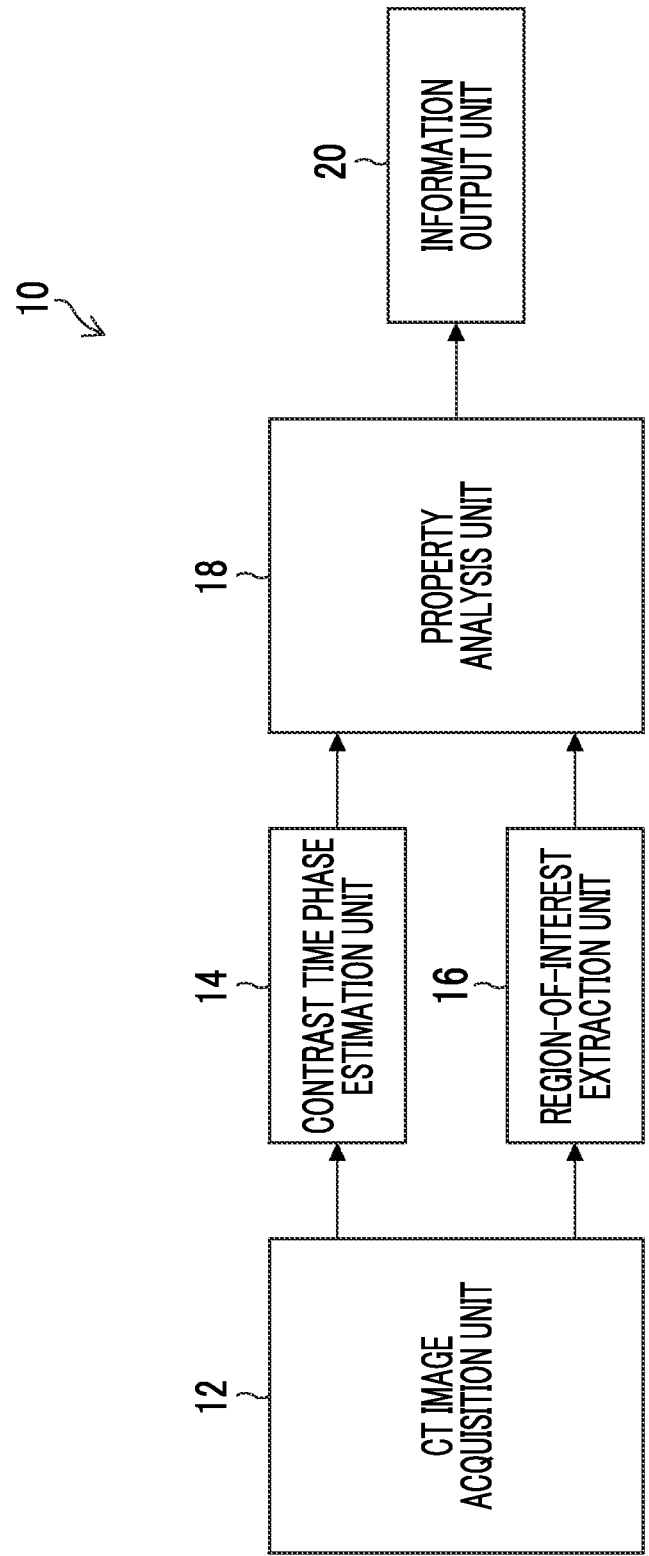
FIG. 4 is a functional block diagram illustrating an outline of processing functions of the property analysis device according to the first embodiment.

FIG. 4 is a functional block diagram illustrating an outline of a processing function of the property analysis device according to the first embodiment. A property analysis device 10 can be implemented using hardware and software of a computer.

The property analysis device 10 comprises a CT image acquisition unit 12, a contrast time phase estimation unit 14, a region-of-interest extraction unit 16, a property analysis unit 18, and an information output unit 20.

The CT image acquisition unit 12 acquires the CT image $I_{IN}$ illustrated in FIG. 3. The CT image acquisition unit 12 may acquire, as the CT image $I_{IN}$, any one slice image or a plurality of slice images in a slice image group including a plurality of slice images generated for every predetermined number of imaging operations.

The contrast time phase estimation unit 14 performs image analysis on the CT image $I_{IN}$ acquired by the CT image acquisition unit 12 to estimate the contrast time phase of the CT image $I_{IN}$. The contrast time phase estimation unit 14 may perform image analysis on the region of interest $R_{OI}$ extracted from the CT image $I_{IN}$ to estimate the contrast time phase of the CT image $I_{IN}$.

That is, the contrast time phase estimation unit 14 acquires the contrast time phase information $I_{NF}$ illustrated in FIG. 3 for each of the CT images $I_{IN}$ and transmits the contrast time phase information $I_{NF}$ to the property analysis unit 18 in association with the CT image $I_{IN}$. The contrast time phase estimation unit 14 may store the CT image $I_{IN}$ and the contrast time phase information $I_{NF}$ to be associated with each other.

In addition, the contrast time phase of the CT image $I_{IN}$ is synonymous with the contrast time phase of a slice image group including the CT image $I_{IN}$ as a slice image. Further, the contrast time phase described in the embodiment is an example of a contrast state. The contrast time phase information $I_{NF}$ described in the embodiment is an example of contrast state information.

The region-of-interest extraction unit 16 extracts the region of interest $R_{OI}$ from the CT image $I_{IN}$ acquired by the CT image acquisition unit 12. The region-of-interest extraction unit 16 can extract a lesion region including a lesion, such as a tumor, as the region of interest $R_{OI}$. The region-of-interest extraction unit 16 may extract the region of interest $R_{OI}$ from the CT image $I_{IN}$ using a trained learning model that has learned the relationship between the CT image $I_{IN}$ and the region of interest $R_{OI}$. The region-of-interest extraction unit 16 may extract the region of interest $R_{OI}$ from the CT image $I_{IN}$ using positional information in the CT image $I_{IN}$ designated by the user.

An example of the learning model is a deep learning model such as a convolutional neural network. The convolutional neural network is referred to as a CNN using an abbreviation of Convolutional Neural Network.

In a case in which the CT image acquisition unit 12 acquires the CT image $I_{IN}$ from which the region of interest $R_{OI}$ has been extracted in advance, the process of the region-of-interest extraction unit 16 is omitted. In a case in which the CT image $I_{IN}$ from which the region of interest $R_{OI}$ has been extracted in advance is acquired, an aspect in which the region-of-interest extraction unit 16 is not provided is also possible.

The region-of-interest extraction unit 16 may acquire information indicating the designation conditions of the region-of-interest $R_{OI}$ in the CT image $I_{IN}$ and extract the region-of-interest $R_{OI}$ from the CT image $I_{IN}$ on the basis of the designation conditions of the region-of-interest $R_{OI}$.

The property analysis unit 18 performs property analysis on the region of interest $R_{OI}$ extracted from the CT image $I_{IN}$ using the contrast time phase information $I_{NF}$ of the CT image $I_{IN}$. A trained learning model which has learned the relationship between the region of interest $R_{OI}$ and the properties of the region of interest $R_{OI}$ can be applied to the property analysis unit 18. An example of the trained learning model is a CNN. The property analysis unit 18 to which the trained learning model is applied is expected to improve the accuracy of property analysis.

The information output unit 20 outputs the analysis result of the property analysis performed by the property analysis unit 18. The information output unit 20 may store the acquired CT image $I_{IN}$ and the analysis result of the property analysis in a storage unit to be associated with each other.

The information output unit 20 functions as an output interface that outputs information indicating the properties of the region of interest $R_{OI}$ in the CT image $I_{IN}$ to be processed. For example, the information output unit 20 may function as an output interface that provides the properties of the region of interest $R_{OI}$ in the CT image $I_{IN}$ to other processing units.

The information output unit 20 may include at least one processing unit that performs, for example, a process of generating data for display and a data conversion process of transmitting the data to the outside. The analysis result of the property analysis device 10 may be displayed using, for example, a display device.

The property analysis device 10 may be incorporated into a medical image processing device for processing a medical image acquired in a medical institution such as a hospital. In addition, the processing functions of the property analysis device 10 may be provided as a cloud service.

Description of Medical Image Used as Input

In a DICOM standard that defines a format of a medical image and a communication protocol, a series ID is defined in a unit called a study ID which is an identification code for specifying a test type. In addition, ID is an abbreviation of identification. Further, the medical image is synonymous with a medicine image.

For example, in a case in which the dynamic contrast-enhanced CT is applied to the liver of a certain patient to perform contrast imaging, CT imaging is performed in a range including the liver a plurality of times while changing the imaging timing. As an example of a plurality of imaging operations, a first imaging operation is performed before the injection of the contrast agent, a second imaging operation is performed 35 seconds after the injection of the contrast agent, a third imaging operation is performed 80 seconds after the injection of the contrast agent, and the fourth imaging operation is performed 150 seconds after the injection of the contrast agent.

The four imaging operations are performed, and four types of CT data are obtained. The CT data referred to here is three-dimensional data composed of a plurality of consecutive slice images and is an aggregate of the plurality of slice images constituting the three-dimensional data, and the aggregate of the plurality of slice images is referred to as an image series.

The same study ID and different series IDs are given to the four types of CT data obtained by performing a series of imaging operations including the four imaging operations.

For example, study 1 is given as a study ID for an examination of liver contrast imaging on a specific patient, and a unique ID is given to each series as follows: series 1 is given as a series ID for CT data obtained by imaging before the injection of the contrast agent; series 2 is given to CT data obtained by imaging 35 seconds after the injection of the contrast agent; series 3 is given to CT data obtained by imaging 80 seconds after the injection of the contrast agent; and series 4 is given to CT data obtained by imaging 150 seconds after the injection of the contrast agent.

Therefore, the CT data can be identified by combining the study ID and the series ID. Meanwhile, in some cases, in the actual CT data, the correspondence relationship between the series ID and the imaging timing is not clearly understood. The imaging timing referred to here may be read as the time elapsed since the injection of the contrast agent.

In addition, the size of the three-dimensional CT data is large. Therefore, in a case in which a process, such as the estimation of the contrast time phase, is performed using the CT data as input data without any change, it may be difficult to process the CT data from the viewpoint of a processing period, a processing load, and the like. Therefore, the property analysis device 10 can estimate the contrast time phase on the basis of image analysis, using one or more slice images in the same image series as an input.

Example of Hardware Configuration of Property Analysis Device

Figure 5:
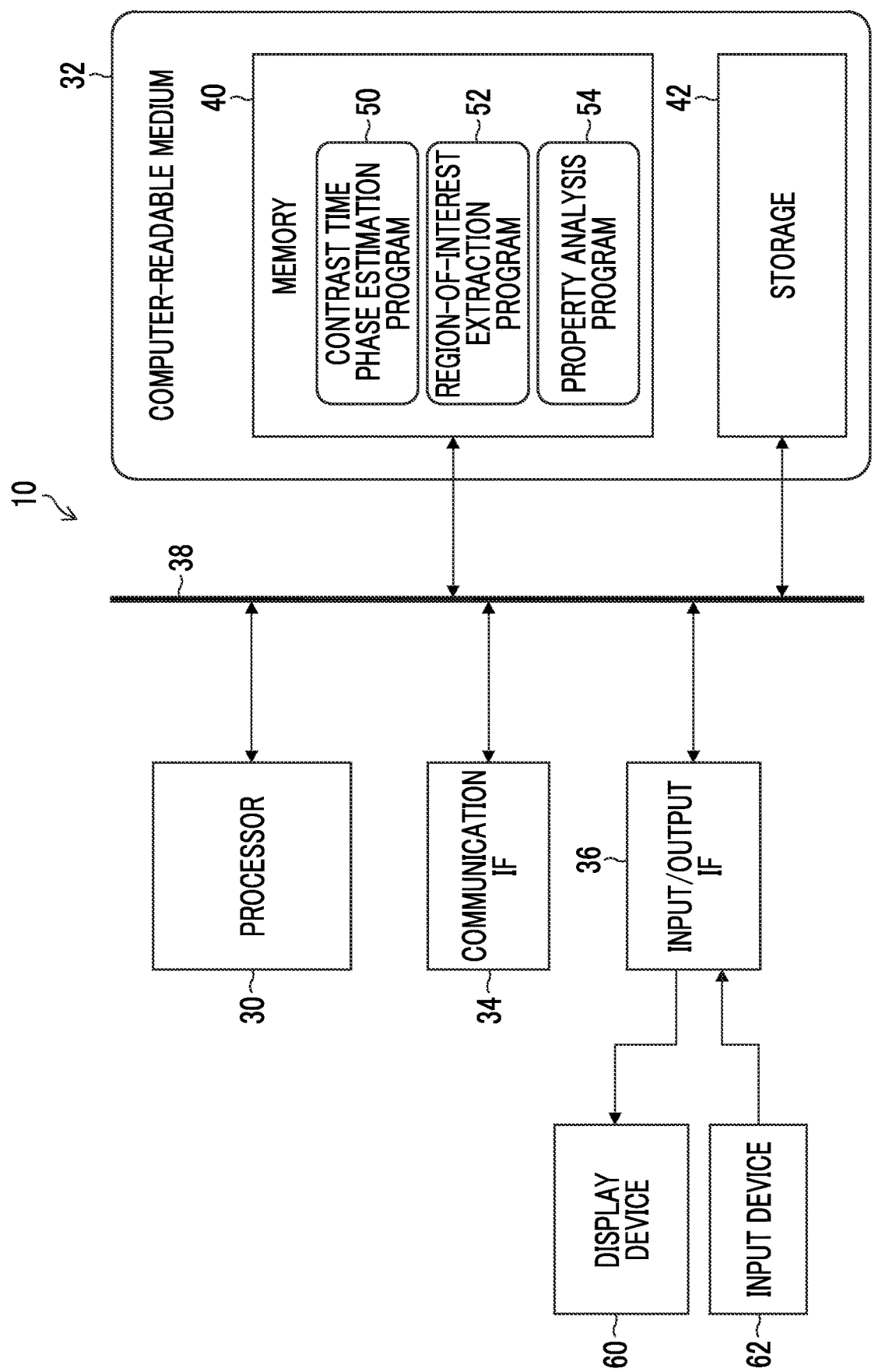
FIG. 5 is a block diagram schematically illustrating an example of a hardware configuration of the property analysis device according to the first embodiment.

FIG. 5 is a block diagram schematically illustrating an example of a hardware configuration of the property analysis device according to the first embodiment. The property analysis device 10 can be implemented by a computer system configured using one or a plurality of computers. Here, an example will be described in which one computer executes a program to implement various functions of the property analysis device 10.

In addition, the form of the computer that functions as the property analysis device 10 is not particularly limited, and the computer may be, for example, a server computer, a workstation, a personal computer, or a tablet terminal. Further, the computer may be a virtual machine.

The property analysis device 10 comprises a processor 30, a computer-readable medium 32 which is a non-transitory tangible object, a communication interface 34, an input/output interface 36, and a bus 38. In addition, the IF illustrated in FIG. 5 indicates an interface.

The processor 30 includes a central processing unit (CPU). The processor 30 may include a graphics processing unit (GPU). The processor 30 is connected to the computer-readable medium 32, the communication interface 34, and the input/output interface 36 through the bus 38. The processor 30 reads, for example, various programs and data stored in the computer-readable medium 32 and performs various processes.

The computer-readable medium 32 includes a memory 40 which is a main storage device and a storage 42 which is an auxiliary storage device. The storage 42 may be configured using a hard disk apparatus, a solid state drive apparatus, an optical disk, a magneto-optical disk, and a semiconductor memory. The storage 42 may be configured using an appropriate combination of a hard disk device and the like. For example, various programs and data are stored in the storage 42.

In addition, the hard disk device may be referred to as an HDD which is an abbreviation of Hard Disk Drive in English. Further, the solid state drive apparatus may be referred to as an SSD which is an abbreviation of Solid State Drive in English.

The memory 40 is used as a work area of the processor 30 and is used as a storage unit that temporarily stores the program and various types of data read from the storage 42. The program stored in the storage 42 is loaded into the memory 40, and commands of the program are executed using the processor 30 such that the processor 30 functions as processing units that perform various processes defined by the program. The memory 40 stores, for example, a contrast time phase estimation program 50, a region-of-interest extraction program 52, and a property analysis program 54 executed by the processor 30 and various types of data.

The contrast time phase estimation program 50 causes the processor 30 to perform a contrast time phase estimation process performed by the contrast time phase estimation unit 14 illustrated in FIG. 4. The contrast time phase estimation program 50 may include a trained learning model.

The region-of-interest extraction program 52 causes the processor 30 to perform a region-of-interest extraction process executed by the region-of-interest extraction unit 16. The region-of-interest extraction program 52 may include a trained learning model.

The property analysis program 54 causes the processor 30 to perform a property analysis process performed by the property analysis unit 18. The property analysis program 54 may include a trained learning model. Each program illustrated in FIG. 5 includes one or more commands. The processor 30 executes the commands included in each program to implement functions corresponding to each program.

The communication interface 34 performs a communication process with an external device wirelessly or in a wired manner to exchange information with the external device. The property analysis device 10 is connected to a communication line through the communication interface 34. The communication line may be a local area network or a wide area network. The communication interface 34 can play a role of a data acquisition unit that receives the input of data such as an image. In addition, the communication line is not illustrated.

The property analysis device 10 may comprise an input device 60 and a display device 62. The input device 60 and the display device 62 are connected to the bus 38 through the input/output interface 36. Examples of the input device 60 include a keyboard, a mouse, a multi-touch panel, other pointing devices, and a voice input device. The input device 60 may be an appropriate combination of the keyboard and the like.

The display device 62 is an output interface on which various types of information are displayed. Examples of the display device 62 include a liquid crystal display, an organic EL display, and a projector. The display device 62 may be an appropriate combination of a liquid crystal display and the like. In addition, the organic EL is referred to as an OEL which is an abbreviation of Organic Electro-Luminescence in English.

Procedure of Property Analysis Method

Figure 6:
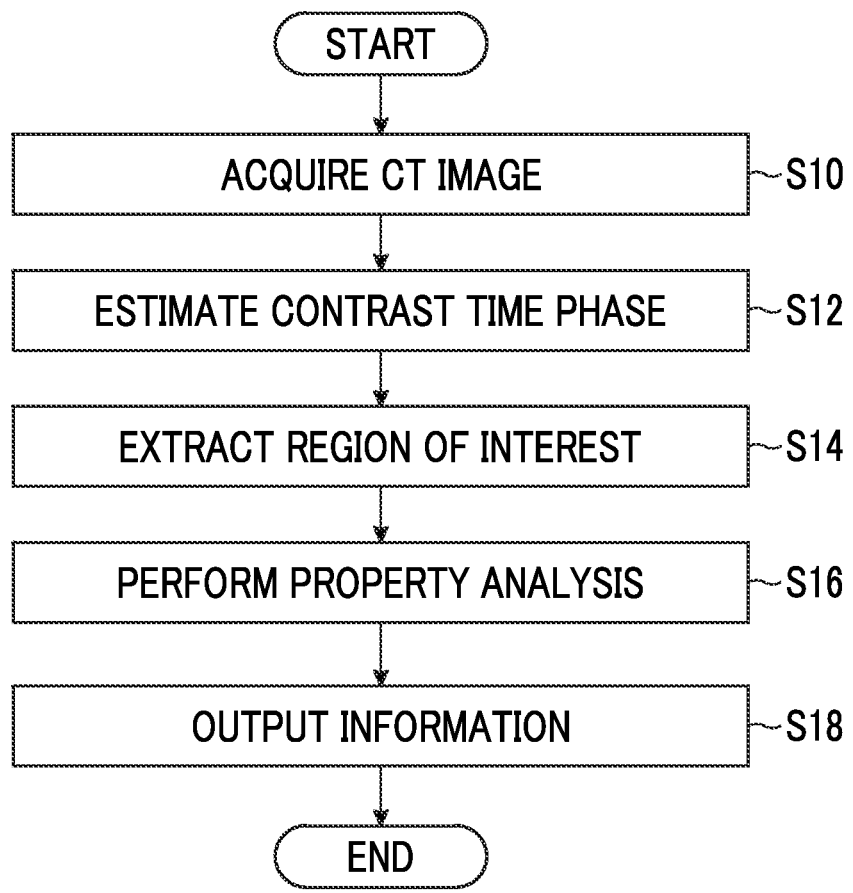
FIG. 6 is a flowchart illustrating a procedure of a property analysis method according to the first embodiment.

FIG. 6 is a flowchart illustrating a procedure of a property analysis method according to the first embodiment. In a CT image acquisition step S10, the CT image acquisition unit 12 illustrated in FIG. 4 acquires the CT image $I_{IN}$ illustrated in FIG. 3. The CT image acquisition step S10 illustrated in FIG. 6 corresponds to the CT image acquisition process $P_1$ illustrated in FIG. 3. After the CT image acquisition step S10, the process proceeds to a contrast time phase estimation step S12.

In the contrast time phase estimation step S12, the contrast time phase estimation unit 14 estimates the contrast time phase of the acquired CT image $I_{IN}$ on the basis of image analysis on the CT image $I_{IN}$. The contrast time phase estimation step S12 illustrated in FIG. 6 corresponds to the contrast time phase estimation process $P_2$ illustrated in FIG. 3. After the contrast time phase estimation step S12, the process proceeds to a region-of-interest extraction step S14.

In the region-of-interest extraction step S14, the region-of-interest extraction unit 16 extracts the region of interest $R_{OI}$ from the CT image $I_{IN}$. After the region-of-interest extraction step S14, the process proceeds to a property analysis step S16. The region-of-interest extraction step S14 may be performed in parallel to the contrast time phase estimation step S12, or the region-of-interest extraction step S14 and the contrast time phase estimation step S12 may be swapped in order.

In addition, in a case in which the CT image $I_{IN}$, from which the region of interest $R_{OI}$ has been extracted in advance, is acquired in the CT image acquisition step S10, the region-of-interest extraction step S14 is omitted, and the process proceeds to the property analysis step S16 after the region-of-interest extraction step S14.

In the property analysis step S16, the property analysis unit 18 performs property analysis on the region of interest $R_{OI}$ of the CT image $I_{IN}$. In the property analysis step S16, the CT image $I_{IN}$ may be associated with the analysis result of the property analysis, and the analysis result of the property analysis may be stored. The property analysis step S16 illustrated in FIG. 6 corresponds to the property analysis process $P_3$ illustrated in FIG. 3. After the property analysis step S16, the process proceeds to an information output step S18.

In the information output step S18, the information output unit 20 outputs the analysis result of the property analysis performed in the property analysis step S16. For the output of the analysis result in the information output step S18, for example, an aspect in which the analysis result is displayed on the display device 62 to be visualized, can be applied. The information output step S18 illustrated in FIG. 6 corresponds to the information output process $P_4$ illustrated in FIG. 3. After the information output step S18, the procedure of the property analysis method is ended.

Waiting for the input of the next CT image $I_{IN}$ may be performed after the information output step S18. In a case in which the next CT image $I_{IN}$ is input, each step from the CT image acquisition step S10 to the information output step S18 may be performed. Waiting for the input of the next CT image $I_{IN}$ after the information output step S18 may be performed. In a case in which the next CT image $I_{IN}$ is not input in a predetermined period, the procedure of the property analysis method may be ended.

In addition, the property analysis method described in the embodiment is an example of a method for operating a medical image processing device to which a computer is applied.

Operation and Effect of First Embodiment

The property analysis device and the property analysis method according to the first embodiment can obtain the following effects.

Image analysis is performed on the CT image $I_{IN}$ to estimate the contrast time phase of the CT image $I_{IN}$, and property analysis is performed on the region of interest $R_{OI}$ of the CT image $I_{IN}$ using the contrast time phase information $I_{NF}$ of the CT image $I_{IN}$. Therefore, the contrast time phase is estimated even in a case in which the information of the injection start time of the contrast agent is lost in the metadata of the CT image $I_{IN}$, and the performance of the property analysis on the region of interest $R_{OI}$ of the CT image $I_{IN}$ using the contrast time phase is stabilized.

In addition, a variation in the contrast time phase caused by a difference in, for example, the physique of the subject is suppressed, and the performance of the property analysis on the region of interest $R_{OI}$ of the CT image $I_{IN}$ using the contrast time phase information $I_{NF}$ is stabilized.

Property Analysis Device According to Second Embodiment

Figure 7:
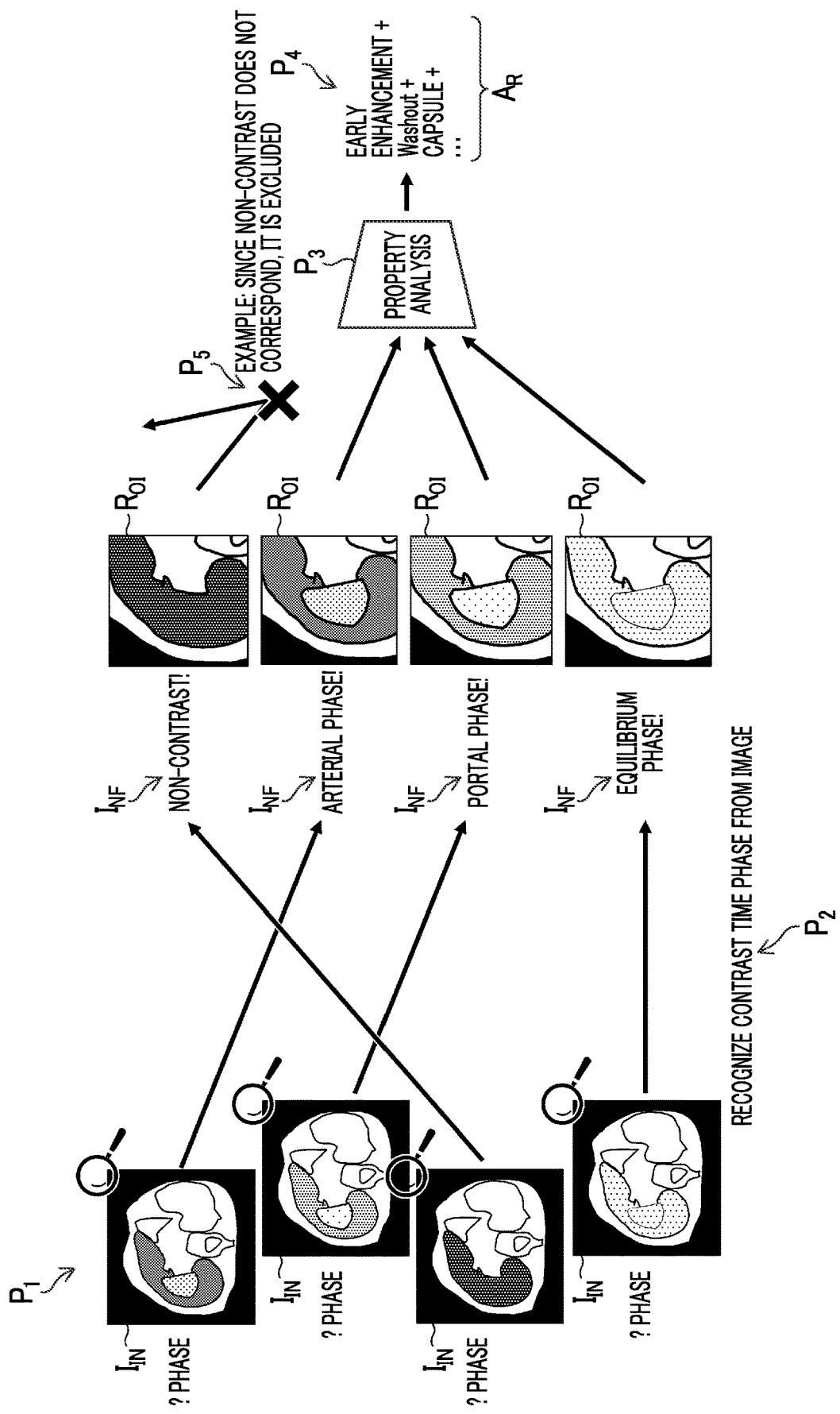
FIG. 7 is a conceptual diagram illustrating an outline of a process applied to a property analysis device according to a second embodiment.

FIG. 7 is a conceptual diagram illustrating an outline of a process applied to a property analysis device according to a second embodiment. Hereinafter, the difference from the first embodiment will be mainly described, and the description of matters common to the first embodiment will be appropriately omitted.

For the processing functions of the property analysis device according to the second embodiment, a selection process $P_5$ for selecting the CT image $I_{IN}$ to be subjected to the property analysis process $P_3$ is performed using the contrast time phase information $I_{NF}$ of the CT image $I_{IN}$. FIG. 7 illustrates the selection process $P_5$ in which the property analysis process $P_3$ does not correspond to the non-contrast CT image $I_{IN}$ and the non-contrast CT image $I_{IN}$ is excluded.

In other words, among the non-contrast CT image $I_{IN}$, the arterial phase CT image $I_{IN}$, the portal phase CT image $I_{IN}$, and the equilibrium phase CT image $I_{IN}$, the arterial phase CT image $I_{IN}$, the portal phase CT image $I_{IN}$, and the equilibrium phase CT image $I_{IN}$ are selected as the objects to be subjected to the property analysis process $P_3$ illustrated in FIG. 7.

Figure 8:
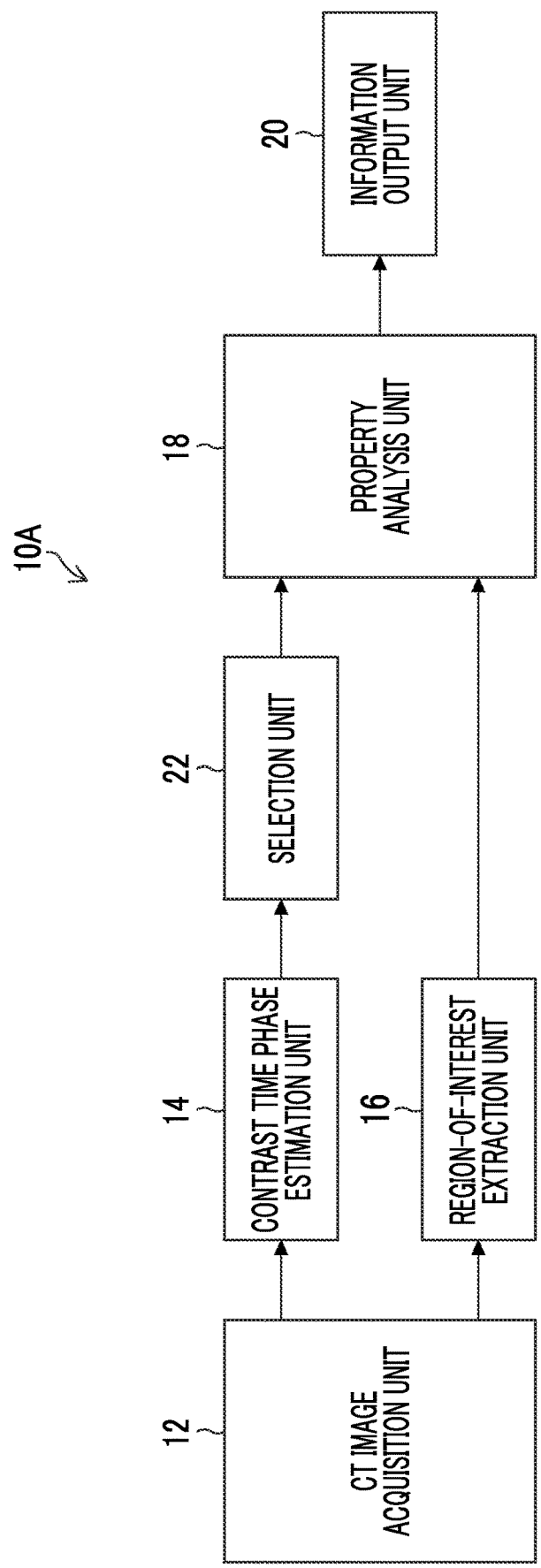
FIG. 8 is a functional block diagram illustrating an outline of processing functions of the property analysis device according to the second embodiment.

FIG. 8 is a functional block diagram illustrating an outline of processing functions of the property analysis device according to the second embodiment. A property analysis device 10A illustrated in FIG. 8 differs from the property analysis device 10 illustrated in FIG. 1 in that a selection unit 22 is added.

The selection unit 22 selects the CT image $I_{IN}$ to be input to the property analysis unit 18 using the contrast time phase information $I_{NF}$ for each CT image $I_{IN}$ estimated by the contrast time phase estimation unit 14. The selection unit 22 may select the CT image $I_{IN}$ on the basis of preset contrast time phase selection conditions. The selection unit 22 may acquire information indicating the contrast time phase selection conditions and select the CT image $I_{IN}$ on the basis of the acquired contrast time phase selection conditions.

Example of Hardware Configuration of Property Analysis Device

Figure 9:
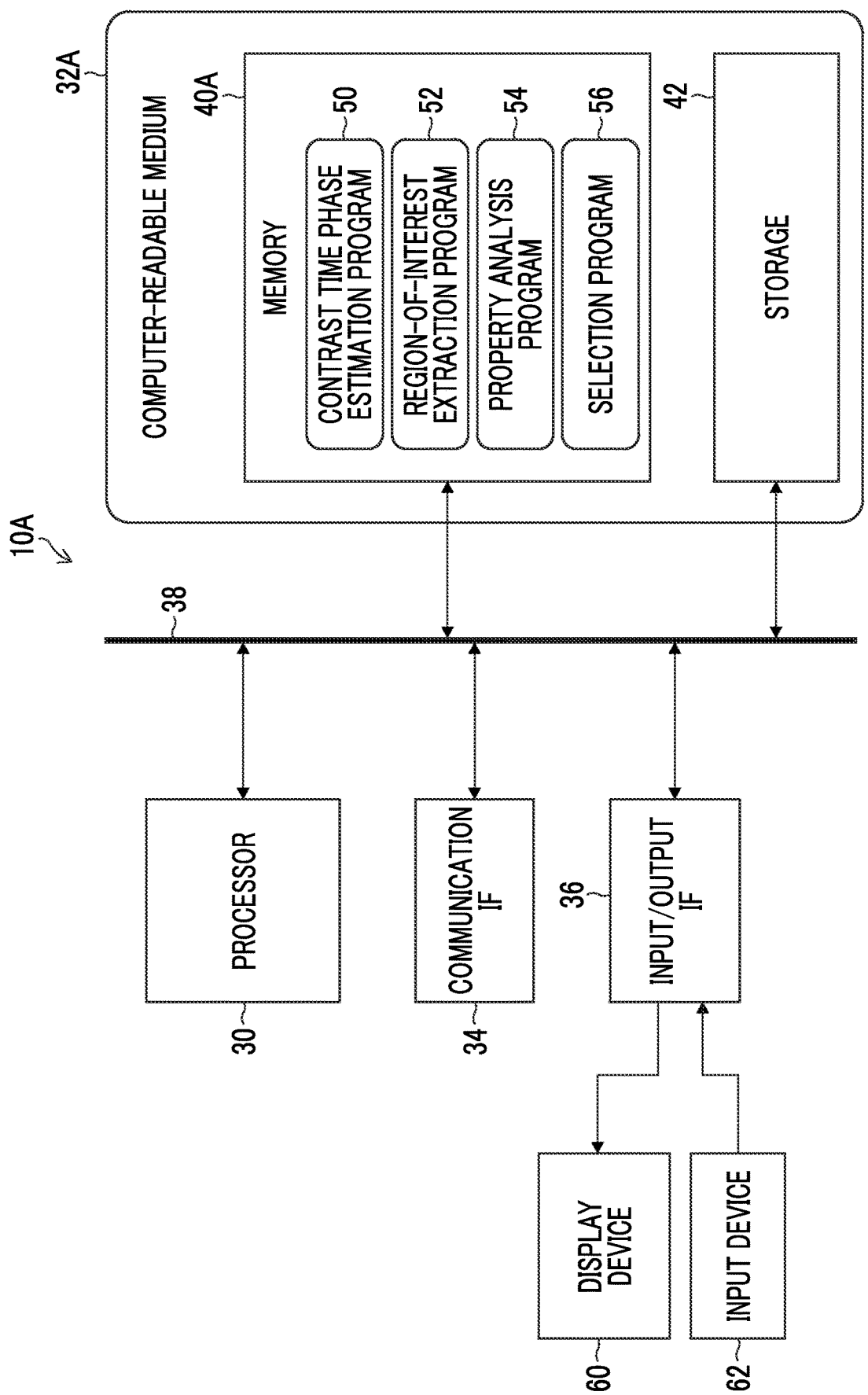
FIG. 9 is a block diagram schematically illustrating an example of a hardware configuration of the property analysis device according to the second embodiment.

FIG. 9 is a block diagram schematically illustrating an example of a hardware configuration of the property analysis device according to the second embodiment. In the property analysis device 10A illustrated in FIG. 9, a selection program 56 is stored in a memory 40A included in a computer-readable medium 32A.

The selection program 56 causes the processor 30 to perform a selection process based on the contrast time phase information $I_{NF}$ which is performed by the selection unit 22 illustrated in FIG. 8. The property analysis program 54 causes the processor 30 to perform the property analysis process on the region of interest $R_{OI}$ of the selected CT image $I_{IN}$.

Procedure of Property Analysis Method

Figure 10:
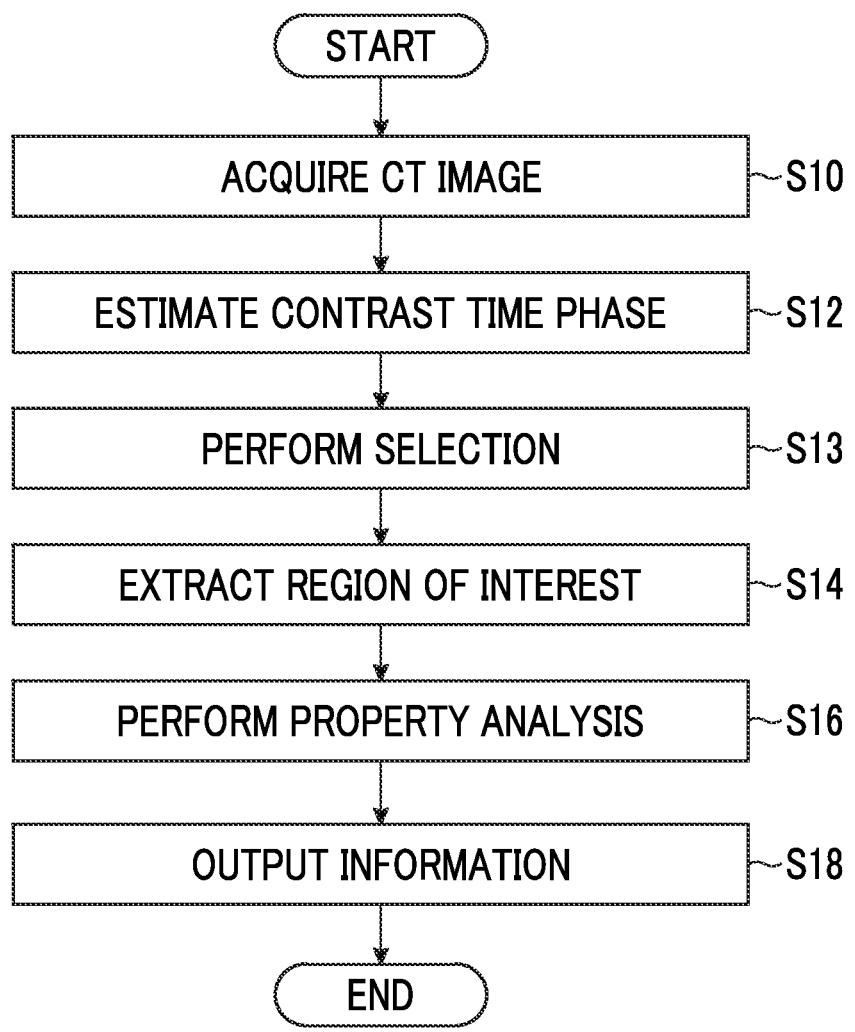
FIG. 10 is a flowchart illustrating a procedure of a property analysis method according to the second embodiment.

FIG. 10 is a flowchart illustrating a procedure of a property analysis method according to the second embodiment. The flowchart illustrated in FIG. 10 differs from the flowchart illustrated in FIG. 6 in that a selection step S13 is added.

That is, after the contrast time phase estimation step S12, the process proceeds to the selection step S13. In the selection step S13, the selection unit 22 illustrated in FIG. 8 selects the CT image $I_{IN}$ to be applied to the property analysis step S16 using the contrast time phase information $I_{NF}$ of each CT image $I_{IN}$. After the selection step S13, the process proceeds to the region-of-interest extraction step S14. Since the same procedure as that in the property analysis method according to the first embodiment can be applied to the region-of-interest extraction step S14, the description thereof will be omitted here.

The selection step S13 and the region-of-interest extraction step S14 may be swapped in order, or the selection step S13 may be performed in parallel to the region-of-interest extraction step S14. That is, the selection step S13 may be performed after the contrast time phase estimation step S12 and before the property analysis step S16.

In a case in which the CT image $I_{IN}$ is selected in the selection step S13, the information output unit 20 may output the selection result in the selection step S13 at the time when outputting the analysis result of the property analysis in the information output step S18. The selection result output in the information output step S18 may be displayed on the display device 62.

Specific Example of Selection Process

Figure 11:
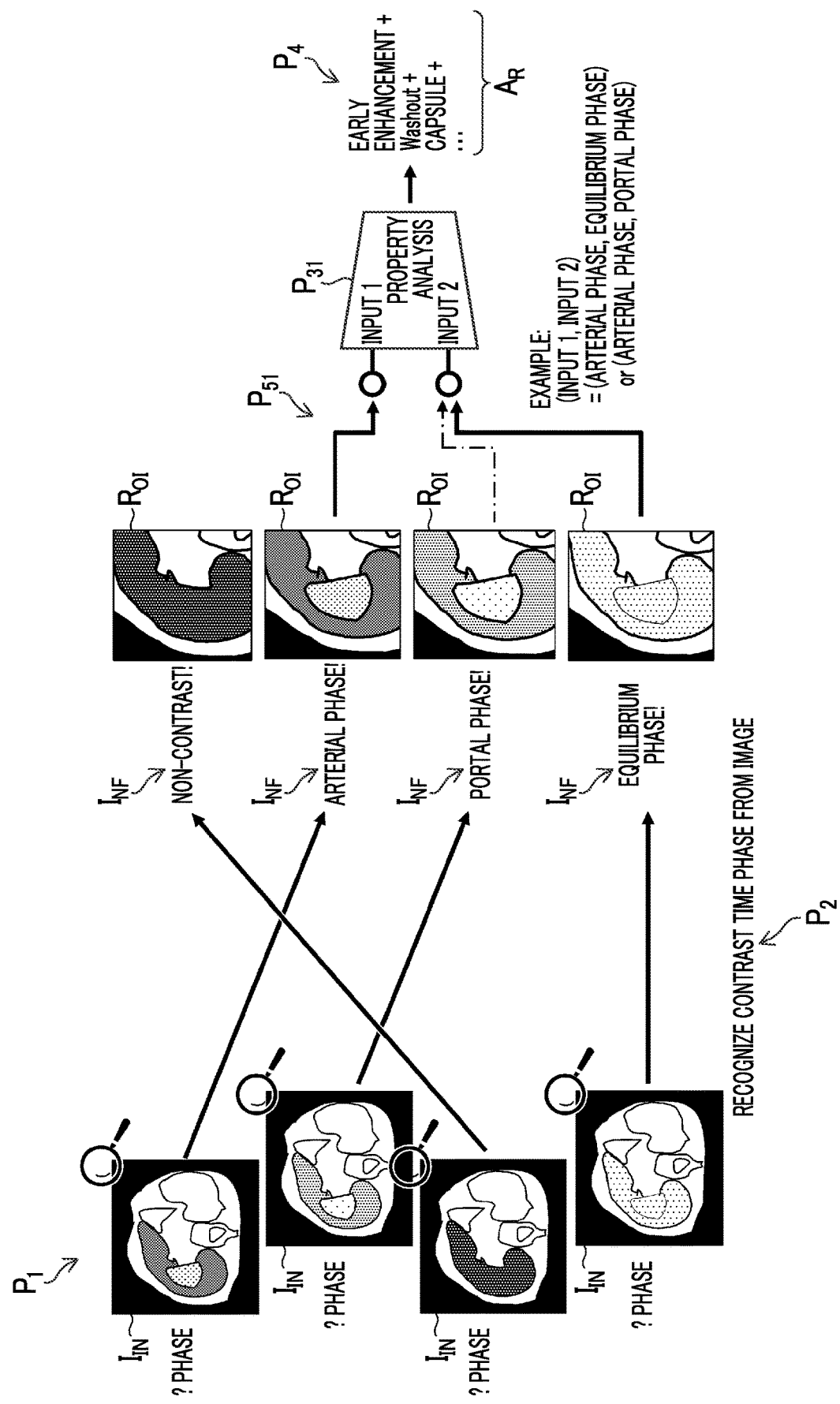
FIG. 11 is a conceptual diagram illustrating a specific example of a selection process.

FIG. 11 is a conceptual diagram illustrating a specific example of the selection process. A selection process $P_{51}$ illustrated in FIG. 11 selects a set of CT images $I_{IN}$ consisting of a set of predetermined contrast time phases using the contrast time phase information $I_{NF}$ of each CT image $I_{IN}$. In other words, the selection process $P_{51}$ selects the CT image $I_{IN}$ for each contrast time phase information item $I_{NF}$ corresponding to each of predetermined two or more types of contrast states. In addition, each contrast time phase information item $I_{NF}$ described in the embodiment is an example of each contrast state information item.

FIG. 11 illustrates a property analysis process $P_{31}$, in which the CT images $I_{IN}$ to be applied are limited to two types and the contrast time phases of the CT images $I_{IN}$ are limited, as the property analysis process $P_3$ illustrated in FIG. 7. FIG. 11 illustrates a combination of the arterial phase and the equilibrium phase and a combination of the arterial phase and the portal phase as a combination of input 1 and input 2 in the property analysis process $P_{31}$.

FIG. 11 illustrates the selection process $P_{51}$ in which two types of CT images $I_{IN}$ having different contrast time phase information items $I_{NF}$ are selected. However, the CT images $I_{IN}$ of the same type having the same contrast time phase information $I_{NF}$ may be input to the input 1 and the input 2.

The selection process $P_5$ illustrated in FIG. 7 may select one or more types of CT images $I_{IN}$ from the CT images $I_{IN}$ from which the contrast time phase information $I_{NF}$ including the non-contrast has been acquired or may select one or more types of CT images $I_{IN}$ from the CT images $I_{IN}$ from which the contrast time phase information $I_{NF}$ excluding the non-contrast has been acquired.

Specific Example of Contrast Time Phase Estimation

Figure 12:
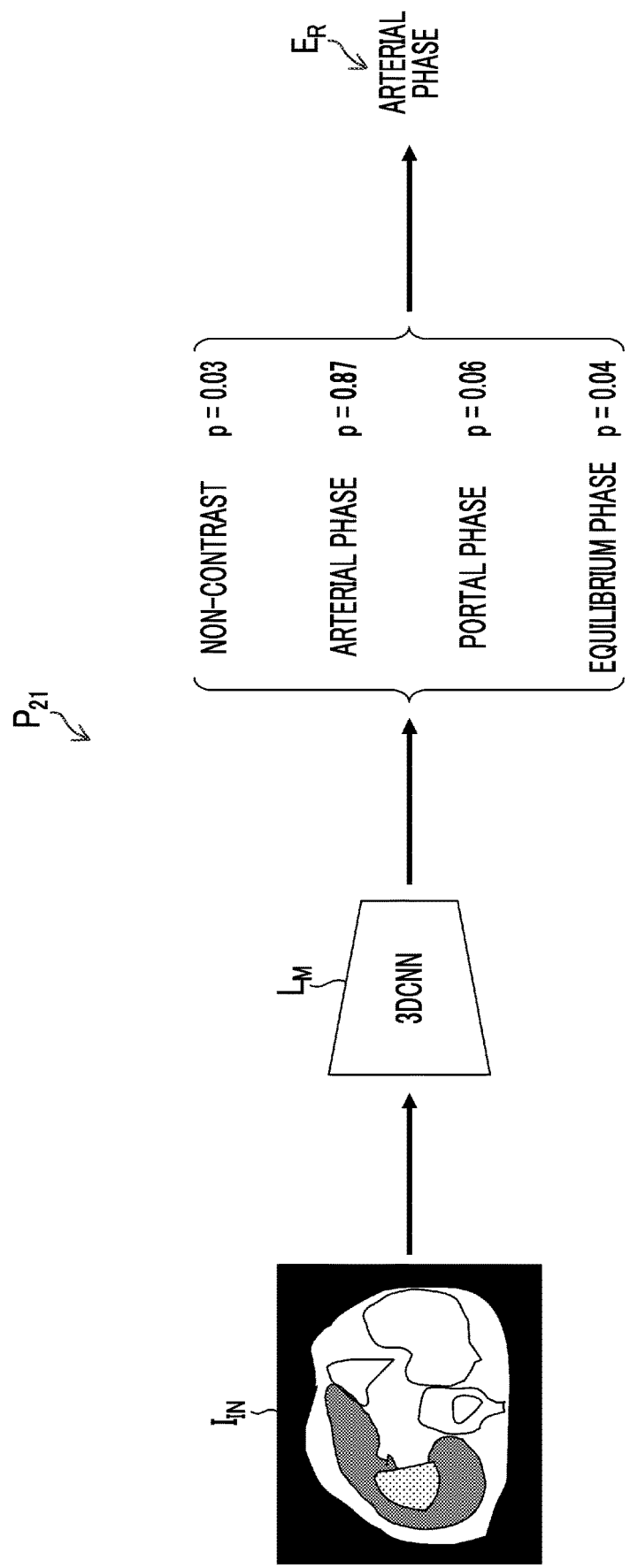
FIG. 12 is a conceptual diagram illustrating an example of contrast time phase estimation.

FIG. 12 is a conceptual diagram illustrating an example of contrast time phase estimation. In FIG. 12, in a contrast time phase estimation process $P_{21}$, a trained learning model $L_M$ is applied, and 3DCNN is illustrated as the trained learning model $L_M$. The 3DCNN collects three-dimensional spatial information and performs three-dimensional convolution. It is expected that the accuracy of the contrast time phase estimation to which the trained learning model $L_M$ is applied will be improved. In addition, 3D in the 3DCNN indicates three dimensions.

In the contrast time phase estimation process $P_{21}$, in a case in which the CT image $I_{IN}$ is input to the learning model $L_M$, information of a class indicating the contrast time phase and a probability p for each class is derived, and the contrast time phase having the maximum probability p is output as an estimation result $E_R$.

FIG. 12 illustrates the learning model $L_M$ that derives the probability p for each class, in which the probability p of non-contrast is 0.03, the probability p of the arterial phase is 0.87, the probability p of the portal phase is 0.06, the probability p of the equilibrium phase is 0.04, and outputs the arterial phase as the estimation result $E_R$ of the contrast time phase of the CT image $I_{IN}$.

In addition, the 3DCNN applied to the contrast time phase estimation process $P_{21}$ illustrated in FIG. 12 is an example, and any classification model can be applied as the trained learning model $L_M$ to the contrast time phase estimation process $P_2$ illustrated in FIG. 3 and the like.

Further, for the contrast time phase estimation, image analysis may be performed on each CT image $I_{IN}$, a value indicating ground truth, which is the time elapsed since the start of the injection of the contrast agent for each CT image IIN may be estimated, and the contrast time phase of each CT image $I_{IN}$ may be estimated with reference to a table in which a correspondence relationship between the time elapsed since the start of the injection of the contrast agent and the contrast time phase is defined. In addition, the specific example of the contrast time phase estimation described with reference to FIG. 12 can also be applied to the first embodiment.

Operation and Effect of Second Embodiment

The property analysis device and the property analysis method according to the second embodiment can obtain the following effects.

The property analysis device 10A comprises the selection unit 22 that selects the CT image $I_{IN}$ suitable for the input of the property analysis unit 18, using the contrast time phase information $I_{NF}$ of each CT image $I_{IN}$. Therefore, the input of the CT image $I_{IN}$ that is not suitable for the input of the property analysis unit 18 to the property analysis unit 18 is suppressed, and the performance of the property analysis in the property analysis unit 18 can be stabilized.

The selection unit 22 performs the selection of the CT image $I_{IN}$ which excludes the CT image $I_{IN}$ having the contrast time phase information $I_{NF}$ of the non-contrast. Therefore, in a case in which the property analysis process $P_3$ that does not correspond to the non-contrast is performed, the input of the CT image $I_{IN}$ that is not suitable for the input of the property analysis unit 18 to the property analysis unit 18 is suppressed, and the performance of the property analysis in the property analysis unit 18 can be stabilized.

The selection unit 22 selects the CT image $I_{IN}$ having the predetermined contrast time phase information $I_{NF}$. Therefore, in a case in which the property analysis process $P_3$ in which the contrast time phase suitable for the input is limited is performed, the input of the CT image $I_{IN}$ that is not suitable for the input of the property analysis unit 18 to the property analysis unit 18 is suppressed, and the performance of the property analysis in the property analysis unit 18 can be stabilized.

The selection unit 22 selects a set of two types of CT images IN having predetermined two types of contrast time phase information $I_{NF}$, respectively. Therefore, two types of CT images $I_{IN}$ corresponding to predetermined two types of contrast time phases are input to the property analysis unit 18, the input of the CT image $I_{IN}$ that is not suitable for the input of the property analysis unit 18 to the property analysis unit 18 is suppressed, and the performance of the property analysis in the property analysis unit 18 can be stabilized.

First Modification Example of Input Image of Property Analysis Device

In the first embodiment and the second embodiment, a three-dimensional image which is three-dimensional CT data is used as the input. However, slice images obtained by cutting out slices from the three-dimensional CT data at equal intervals may be used as the input.

Further, instead of the slice image, for example, MIP images configured at equal intervals and an average image generated from a plurality of slice images may be used. In addition, MIP is an abbreviation of Maximum Intensity Projection.

Second Modification Example of Input Image of Property Analysis Device

A combination of a plurality of types of data elements may be input to the CT image acquisition unit 12 illustrated in FIG. 6 and the like. For example, at least one of a three-dimensional image, a slice image, an MIP image, or an average image which are partial images of CT data of the same image series may be used as the input, a combination of the plurality of image types may be input to the CT image acquisition unit 12, and an output may be obtained from the information output unit 20.

For example, a combination of the average image and the MIP image may be input to the CT image acquisition unit 12, and an output may be obtained from the information output unit 20. The three-dimensional image referred to here means a set of a plurality of slice images.

In this embodiment, the dynamic contrast-enhanced CT is given as an example of the dynamic contrast. However, the property analysis described in this embodiment can also be applied to a modality to which dynamic contrast, such as dynamic contrast MRI, other than the CT can be applied.

Specific Example of Property Analysis Process

Figure 13:
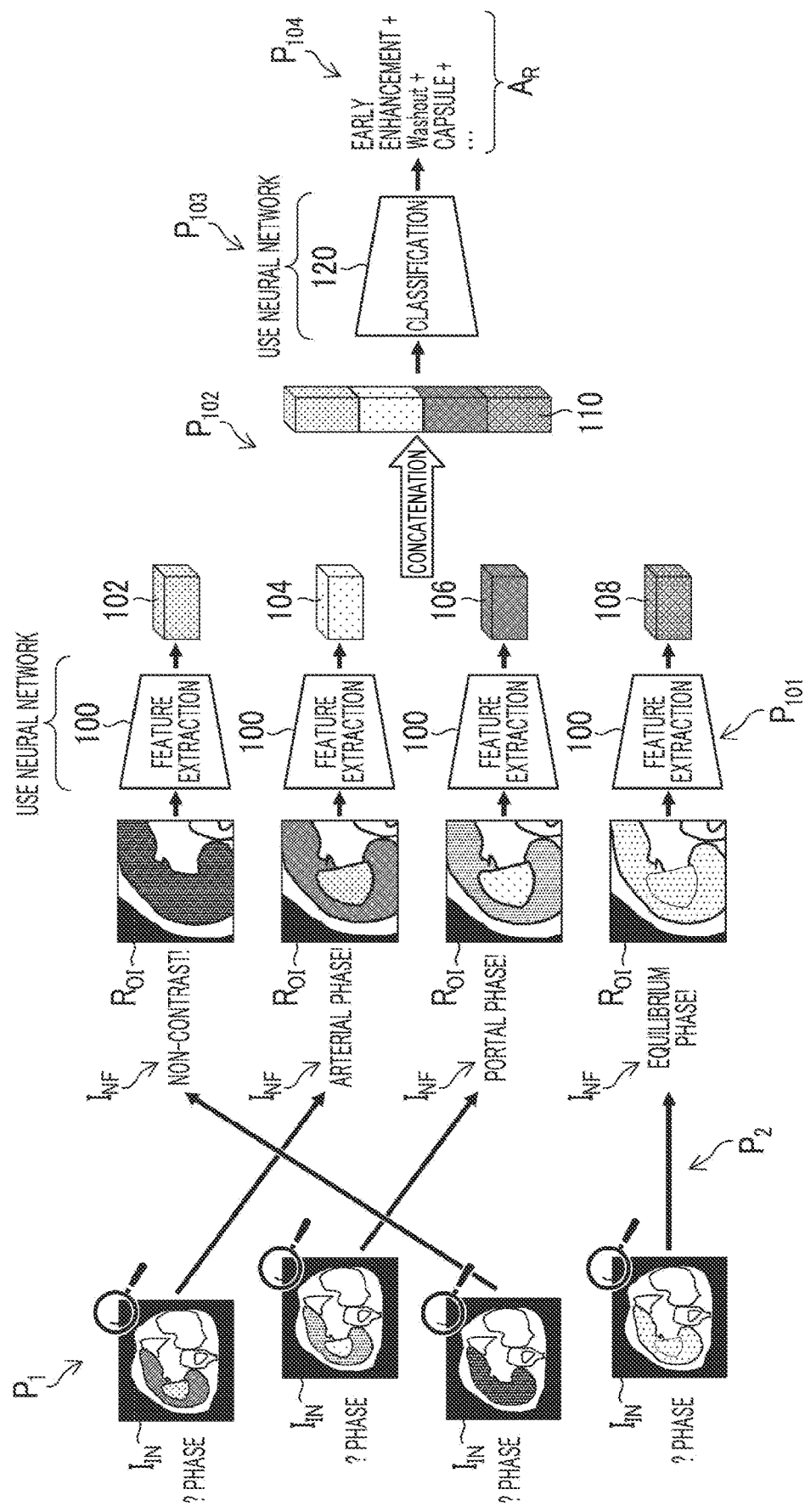
FIG. 13 is a conceptual diagram illustrating a specific example of a property analysis process.

FIG. 13 is a conceptual diagram illustrating a specific example of the property analysis process. In the property analysis process illustrated in FIG. 13, the feature amounts of the regions of interest $R_{OI}$ extracted from the acquired CT images $I_{IN}$ of each contrast time phase are extracted. Then, the feature amounts of the regions of interest $R_{OI}$ extracted from the CT images $I_{IN}$ of each contrast time phase are concatenated, and a property classification process is performed as property analysis. Therefore, the property analysis process considering the feature amounts of a plurality of contrast time phases is performed.

The property analysis device 10 illustrated in FIG. 4 is applied as a property analysis device that performs the property analysis process illustrated in FIG. 13, and the property analysis unit 18 performs the property analysis process illustrated in FIG. 13.

First, the CT image acquisition process $P_1$ is performed to acquire the CT image $I_{IN}$. Then, the contrast time phase estimation process $P_2$ is performed to estimate the contrast time phase of the CT image $I_{IN}$, and the contrast time phase information $I_{NF}$ of each CT image $I_{IN}$ is acquired. In addition, the region of interest $R_{OI}$ is extracted from the CT image $I_{IN}$. As the processes up to here, the same processes as the CT image acquisition process $P_1$ and the contrast time phase estimation process $P_2$ illustrated in FIG. 3 and the like are performed.

In a case in which the CT image $I_{IN}$ from which the region of interest $R_{OI}$ has not been extracted is acquired, the region of interest $R_{OI}$ is extracted from the CT image $I_{IN}$. In a case in which the CT image $I_{IN}$ from which the region of interest $R_{OI}$ has been extracted is acquired, the process of extracting the region of interest $R_{OI}$ from the CT image $I_{IN}$ is not performed.

Then, a feature extraction process $P_{101}$ is performed to extract the feature amount of each CT image $I_{IN}$ from the region of interest $R_{OI}$ included in each of the CT images $I_{IN}$ from which the contrast time phases have been estimated, using a feature extraction network 100.

The feature extraction network 100 outputs a feature vector 102 indicating the feature amount of the non-contrast, a feature vector 104 indicating the feature amount of the arterial phase, a feature vector 106 indicating the feature amount of the portal phase, and a feature vector 108 indicating the feature amount of the equilibrium phase.

One-dimensional feature vectors are applied as the feature vector 102, the feature vector 104, the feature vector 106, and the feature vector 108. That is, the feature extraction process $P_{101}$ is a process in which the feature extraction network 100 outputs the same number of feature vectors 102 as the number of regions of interest $R_{OI}$ input.

Then, a concatenation process $P_{102}$ is performed to concatenate the feature vector 102, the feature vector 104, the feature vector 106, and the feature vector 108, and feature data 110 is generated.

Further, a property analysis process $P_{103}$ is performed, and a classification network 120 performs the property classification process on the basis of the feature data 110. The property analysis process $P_{103}$ based on the feature data 110 corresponds to the property analysis process $P_3$ illustrated in FIG. 3.

Furthermore, an information output process $P_{104}$ is performed, and the classification network 120 outputs a property classification result as the analysis result $A_R$. A neural network may be applied as the feature extraction network 100 and the classification network 120.

In the property analysis process illustrated in FIG. 13, property analysis considering the features of the region of interest $R_{OI}$ in a plurality of contrast time phases is performed. In addition, the configuration in which each of the contrast time phase estimation process, the feature extraction process, and the property classification process is performed, the feature vectors are extracted from each region of interest $R_{OI}$, the feature vectors are concatenated, and the region of interest $R_{OI}$ is classified using the feature data 110 obtained by concatenating the feature vectors can reduce the influence of the positional deviation between the contrast time phases and reduce the influence of the breathing of a patient and the movement of the patient.

FIG. 13 illustrates an aspect in which four feature extraction networks 100 are used for the region of interest $R_{OI}$ of the non-contrast, the region of interest $R_{OI}$ of the arterial phase, the region of interest $R_{OI}$ of the portal phase, and the region of interest $R_{OI}$ of the equilibrium phase. However, one feature extraction network 100 may be used in common.

In a case in which a plurality of feature vectors are compared in a common feature space, it is desirable to use one feature extraction network.

The feature extraction network 100 and the classification network 120 illustrated in FIG. 13 may be components constituting one trained model. For example, a network for performing feature extraction and a network for performing property analysis may be integrated into one network for performing property analysis on the region of interest $R_{OI}$.

Figure 14:
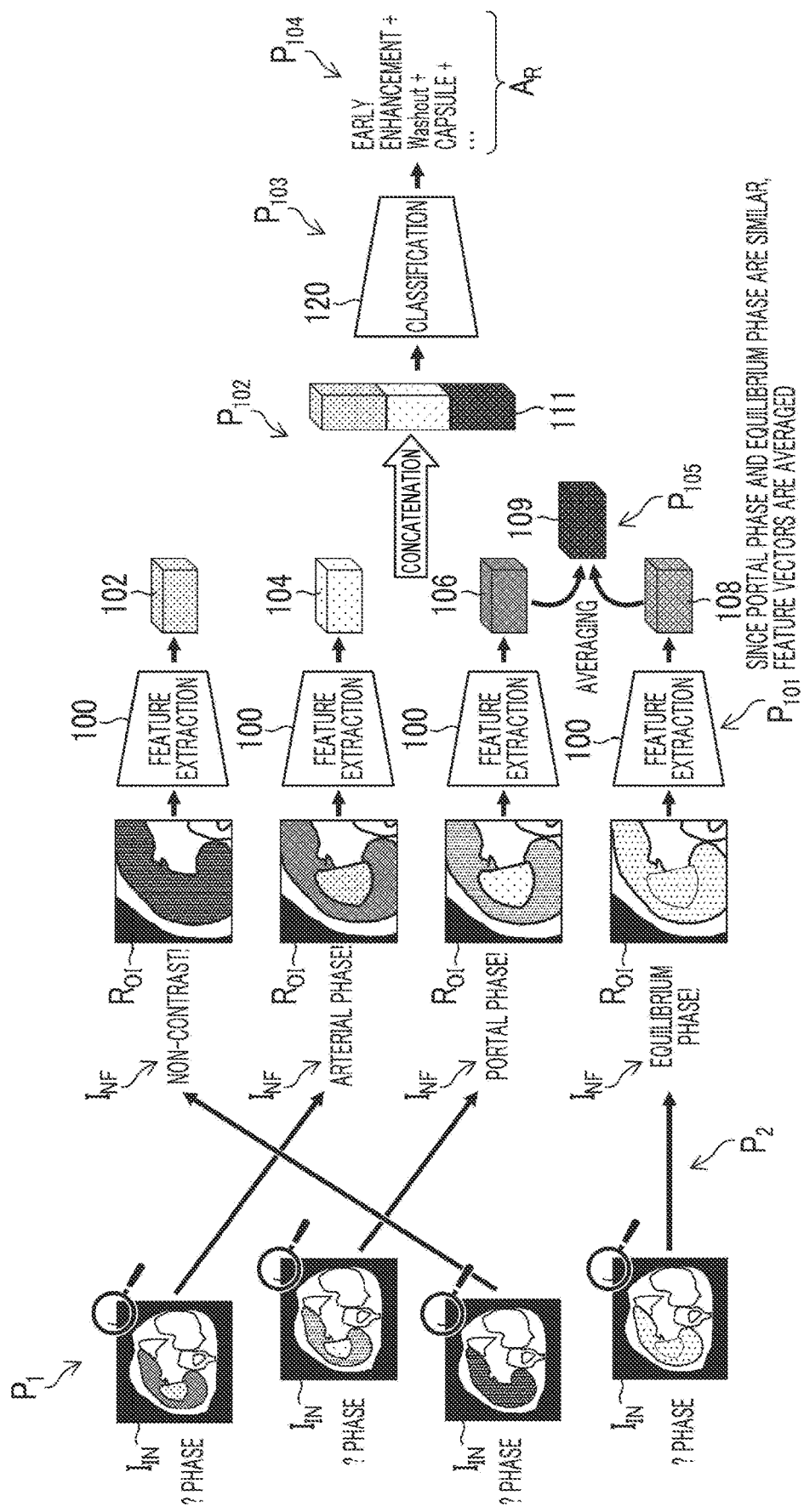
FIG. 14 is a conceptual diagram illustrating a modification example of the property analysis process illustrated in FIG. 13.

FIG. 14 is a conceptual diagram illustrating a modification example of the property analysis process illustrated in FIG. 13. In a property analysis process illustrated in FIG. 14, the feature amounts of some contrast time phases are averaged, as compared to the property analysis process illustrated in FIG. 13.

Specifically, the property analysis process illustrated in FIG. 14 differs from the property analysis process illustrated in FIG. 13 in that an averaging process $P_{105}$ that averages the feature vector 106 of the portal phase and the feature vector 108 of the equilibrium phase to generate a feature vector 109 is added after the feature extraction process $P_{101}$.

Since the feature amount of the region of interest $R_{OI}$ of the portal phase is similar to the feature amount of the region of interest $R_{OI}$ of the equilibrium phase, the two feature vectors are averaged and combined into one. This makes it possible to reduce the number of feature vectors in a case in which feature data 111 is generated. In addition, FIG. 14 illustrates an example of the CT image obtained by performing the dynamic contrast-enhanced CT of the liver. However, the same process can also be performed on contrast time phases having similar feature amounts in other organs.

Figure 15:
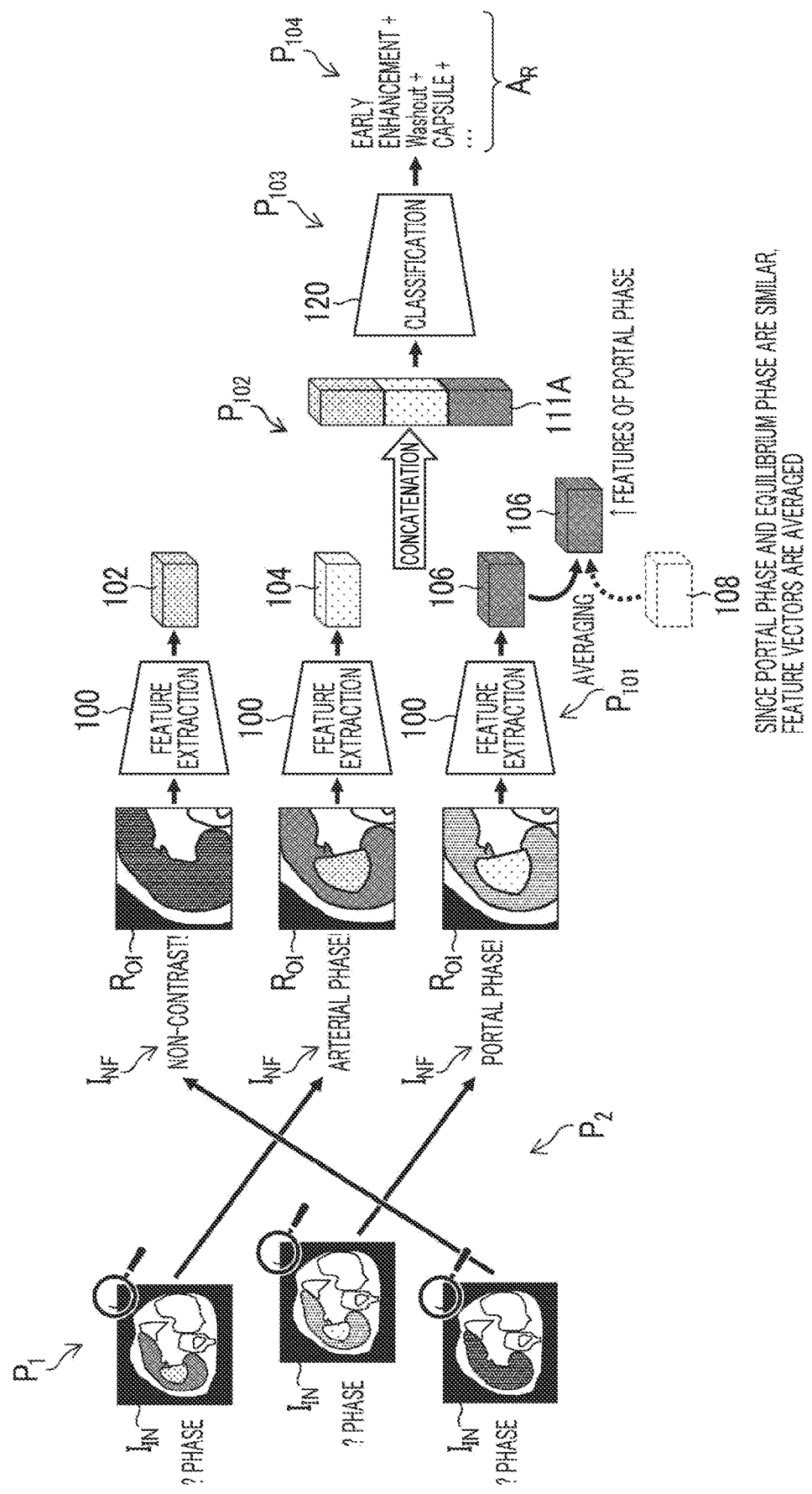
FIG. 15 is a conceptual diagram illustrating a specific example of the property analysis process in a case in which CT images of some contrast time phases are lost.

FIG. 15 is a conceptual diagram illustrating a specific example of the property analysis process in a case in which the CT images of some contrast time phase are lost. FIG. 15 illustrates a case in which the CT image $I_{IN}$ of the equilibrium phase is lost.

In the concatenation process $P_{102}$ illustrated in FIG. 15, since the feature vector 108 of the equilibrium phase is lost, the feature vector 106 indicating the features of the portal phase is treated as a feature vector obtained by averaging the feature vector 106 indicating the features of the portal phase and the feature vector 108 indicating the features of the equilibrium phase.

That is, in the concatenation process $P_{102}$ illustrated in FIG. 15, the feature vector 102 indicating the features of the non-contrast, the feature vector 104 indicating the features of the arterial phase, and the feature vector 106 indicating the features of the portal phase are concatenated to generate feature data 111A.

In the property analysis process illustrated in FIG. 15, even in a case in which the CT images $I_{IN}$ of some contrast time phases are lost, it is possible to perform property analysis based on the estimation results of the contrast time phases. FIG. 15 illustrates the case in which the CT image $I_{IN}$ of the equilibrium phase is lost. However, the property analysis process may be applied to a case in which the CT image $I_{IN}$, such as the CT image $I_{IN}$ of the portal phase, other than the CT image $I_{IN}$ of the equilibrium phase is lost.

Figure 16:
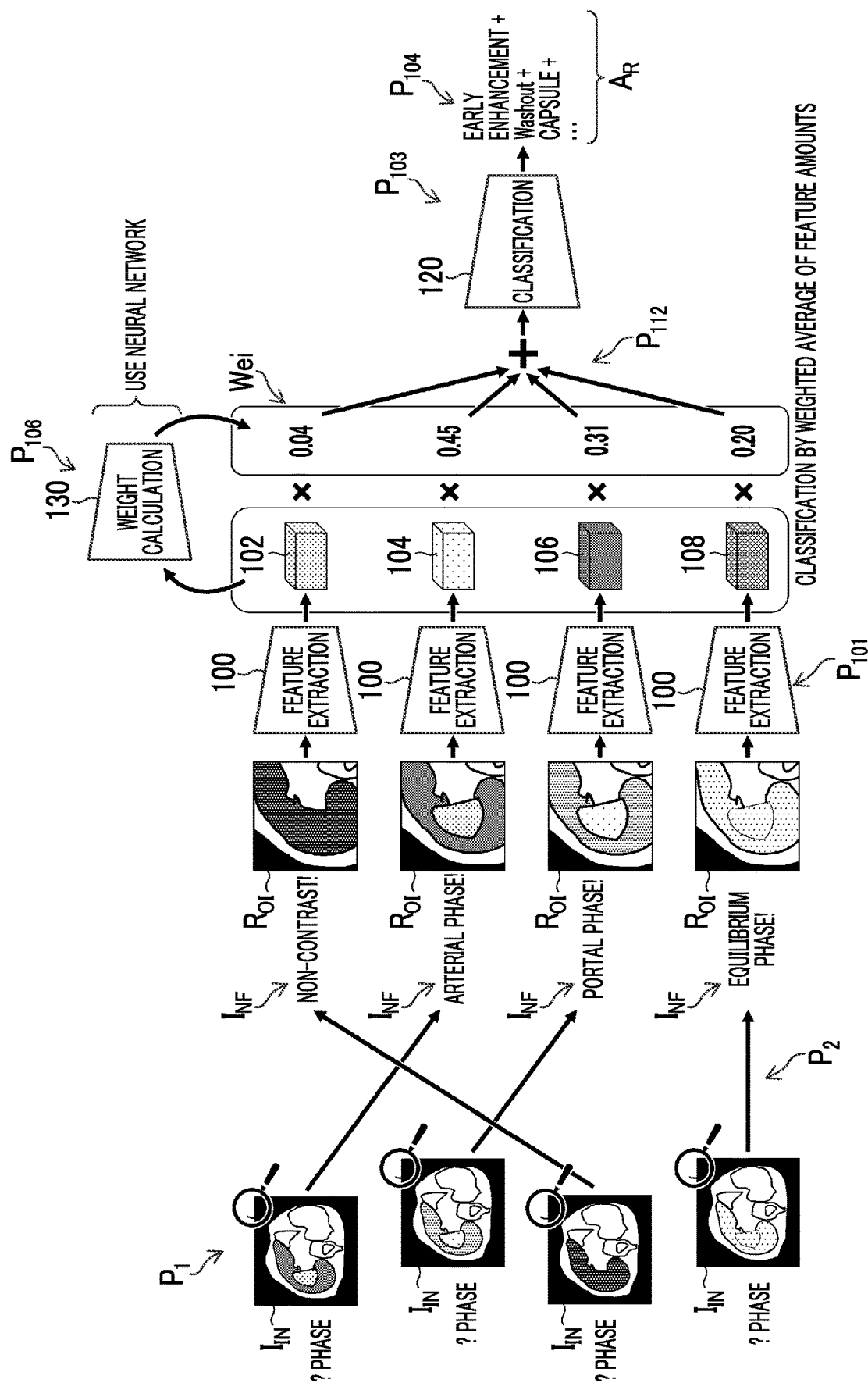
FIG. 16 is a conceptual diagram illustrating another specific example of the property analysis process.

FIG. 16 is a conceptual diagram illustrating another specific example of the property analysis process. In a property analysis process illustrated in FIG. 16, the feature amount of the region of interest $R_{OI}$ of each contrast time phase is extracted, the feature amount of the region of interest $R_{OI}$ of each contrast time phase is weighted and averaged, and the property classification process is performed.

Specifically, a weight calculation network 130 is provided which calculates a weight $W_{ei}$ applied in a case in which the feature amount of the region of interest $R_{OI}$ of each contrast time phase is weighted and averaged. A neural network is applied as the weight calculation network 130.

The weight calculation network 130 performs a weight calculation process $P_{106}$ that calculates the weight $W_{ei}$ indicating how much the feature amounts of the regions of interest $R_{OI}$ of each contrast time phase has contributed to property classification. In the weight calculation process $P_{106}$, the weight $W_{ei}$ may be calculated separately for each feature amount.

In a case in which the feature amounts of the regions of interest $R_{OI}$ of each contrast time phase are input, the weight calculation network 130 outputs the dynamic weights $W_{ei}$ for the feature amounts of the regions of interest $R_{OI}$. In addition, the weights $W_{ei}$ for the feature amounts of the regions of interest $R_{OI}$ of each contrast time phase illustrated in FIG. 16 are an example, and any numerical values are illustrated.

In the weighted averaging process $P_{112}$, a weighting and averaging process is performed on the feature amounts of the regions of interest $R_{OI}$ of each contrast time phase, using the weight $W_{ei}$. In the property analysis process $P_{103}$, the classification network 120 performs the property classification process on the basis of the weighted average of the feature amounts of the regions of interest $R_{OI}$ of each contrast time phase. In the information output process $P_{104}$, the analysis result $A_R$ is output.

The feature extraction network 100, the weight calculation network 130, and the classification network 120 can collectively perform learning, using a set of the region of interest $R_{OI}$ in which the contrast time phase has been estimated and the property classification result as training data. Backpropagation can be applied as a learning algorithm of the feature extraction network 100, the weight calculation network 130, and the classification network 120.

That is, the feature extraction network 100, the weight calculation network 130, and the classification network 120 perform learning that minimizes the loss of the output of the classification network 120 for each input.

For the learning of the feature extraction network 100 and the classification network 120 illustrated in FIGS. 13 to 15, backpropagation is also applied as the learning algorithm, and the feature extraction network 100 and the classification network 120 perform learning that minimizes the loss of the output of the classification network 120 for each input.

In addition, the feature extraction network 100 described in the embodiment is an example of a feature extraction model. The classification network 120 described in the embodiment is an example of a property analysis model. The weight calculation network 130 described in the embodiment is an example of a weight calculation model.

Example of Configuration of Medical Imaging System

Figure 17:
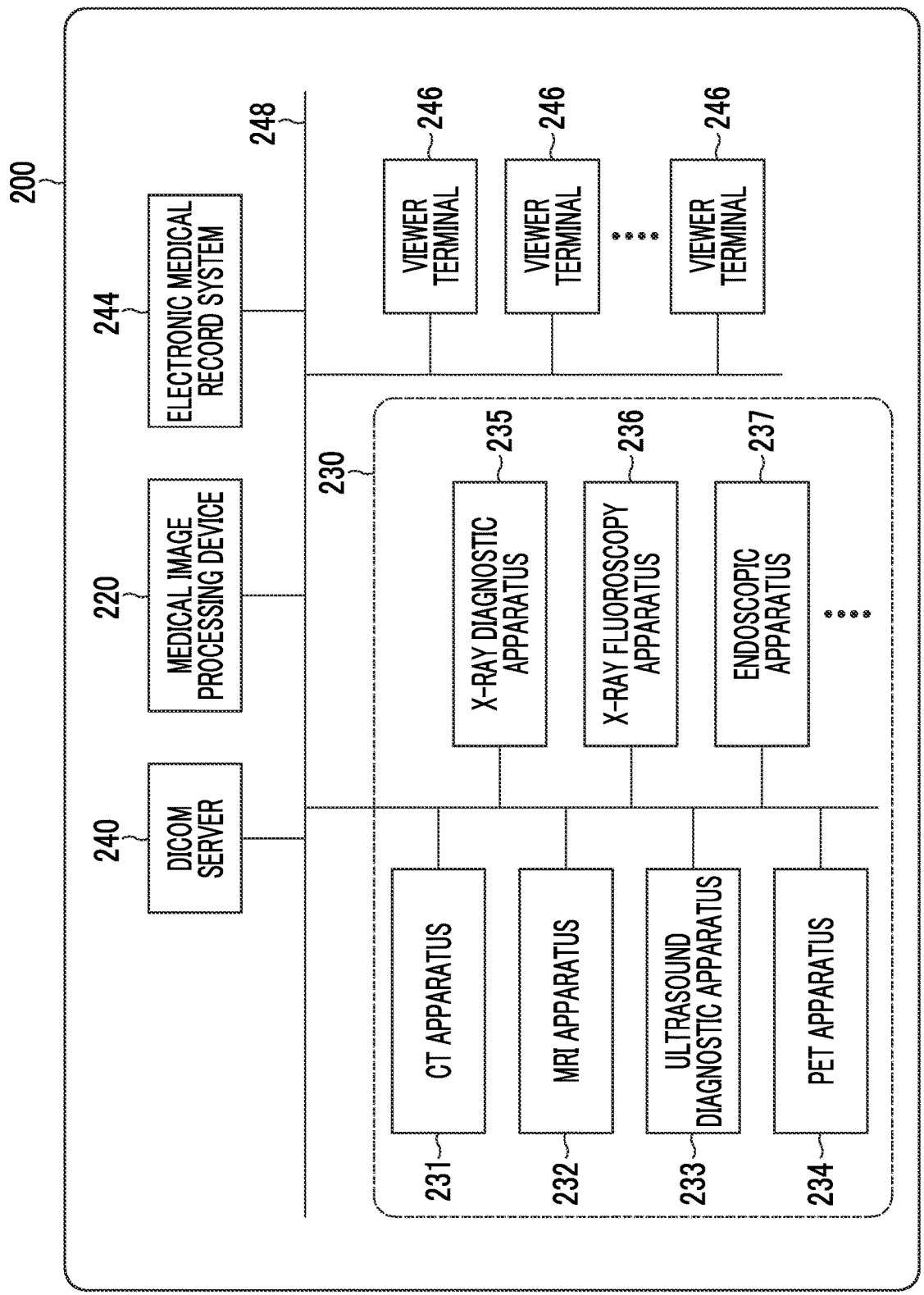
FIG. 17 is a block diagram illustrating an example of a configuration of a medical information system in which the property analysis device is used.

FIG. 17 is a block diagram illustrating an example of a configuration of a medical information system in which the property analysis device is used. The property analysis devices 10 and the like described in the first embodiment and the second embodiment can be incorporated into a medical image processing device 220 illustrated in FIG. 17.

A medical information system 200 is a computer network constructed in a medical institution such as a hospital. The medical information system 200 comprises a modality 230 that captures a medical image, a DICOM server 240, the medical image processing device 220, an electronic medical record system 244, and a viewer terminal 246. Elements of the medical information system 200 are connected through a communication line 248. The communication line 248 may be a local communication line in the medical institution. Further, a portion of the communication line 248 may be a wide area communication line.

Specific examples of the modality 230 include a CT apparatus 231, an MRI apparatus 232, an ultrasound diagnostic apparatus 233, a PET apparatus 234, an X-ray diagnostic apparatus 235, an X-ray fluoroscopy apparatus 236, and an endoscopic apparatus 237. There may be various combinations of types of the modalities 230 connected to the communication line 248 for each medical institution. In addition, MRI is an abbreviation of Magnetic Resonance Imaging. PET is an abbreviation of Positron Emission Tomography.

The DICOM server 240 is a server that operates according to the specifications of DICOM. The DICOM server 240 is a computer that stores various types of data including the images captured by the modality 230 and manages various types of data. The DICOM server 240 comprises a large-capacity external storage device and a database management program.

The DICOM server 240 communicates with other devices through the communication line 248 to transmit and receive various types of data including image data. The DICOM server 240 receives the image data generated by the modality 230 and other various types of data through the communication line 248, stores the data in a recording medium, such as a large-capacity external storage device, and manages the data. In addition, the storage format of the image data and the communication between the devices via the communication line 248 are based on a DICOM protocol.

The medical image processing device 220 can acquire data from the DICOM server 240 and the like through the communication line 248. The medical image processing device 220 performs image analysis and various other processes on the medical image captured by the modality 230. The medical image processing device 220 may be configured to perform various computer-aided diagnosis analysis processes, such as a process of recognizing a lesion region and the like from an image, a process of specifying a classification, such as a disease name, and a segmentation process of recognizing a region, such as an organ, in addition to the processing functions of the property analysis device 10. In addition, the computer-aided diagnosis can be referred to as CAD which is an abbreviation of Computer Aided Diagnosis or Computer Aided Detection.

Further, the medical image processing device 220 can transmit the processing result to the DICOM server 240 and the viewer terminal 246. The processing functions of the medical image processing device 220 may be provided in the DICOM server 240 or the viewer terminal 246.

Various types of data stored in the database of the DICOM server 240 and various types of information including the processing result generated by the medical image processing device 220 can be displayed on the viewer terminal 246.

The viewer terminal 246 is an image viewing terminal called a PACS viewer or a DICOM viewer. A plurality of viewer terminals 246 may be connected to the communication line 248. In addition, PACS is an abbreviation of Picture Archiving and Communication System. The form of the viewer terminal 246 is not particularly limited and may be, for example, a personal computer, a workstation, or a tablet terminal.

For Program for Operating Computer

A program that causes a computer to implement the processing functions of the property analysis device 10 and the like can be recorded on a computer-readable medium which is a non-transitory tangible information storage medium, such as an optical disk, a magnetic disk, or a semiconductor memory. Then, the program can be provided through the information storage medium.

Further, instead of the aspect in which the program is stored in the non-transitory tangible computer-readable medium and then provided, program signals may be provided as a download service using a telecommunication line such as the Internet.

Further, some or all of the processing functions of the property analysis device 10 and the like may be implemented by cloud computing or may be provided as a SasS service. In addition, SasS is an abbreviation of Software as a Service.

For Hardware Configuration of Each Processing Unit

A hardware structure of processing units performing various processes, such as the CT image acquisition unit 12, the contrast time phase estimation unit 14, the region-of-interest extraction unit 16, the property analysis unit 18, and the information output unit 20, in the property analysis device 10 and the like are the following various processors.

The various processors include, for example, a CPU which is a general-purpose processor executing a program to function as various processing units, a GPU which is a processor specialized for image processing, a programmable logic device (PLD), such as a field programmable gate array (FPGA), which is a processor whose circuit configuration can be changed after manufacture, and a dedicated electric circuit, such as an ASIC, which is a processor having a dedicated circuit configuration designed to perform a specific process.

In addition, the programmable logic device may be referred to as a PLD which is an abbreviation of Programmable Logic Device in English. ASIC is an abbreviation of Application Specific Integrated Circuit.

One processing unit may be configured by one of the various processors or a combination of two or more processors of the same type or different types. For example, one processing unit may be configured using a plurality of FPGAs, a combination of a CPU and an FPGA, or a combination of a CPU and a GPU.

Further, a plurality of processing units may be configured by one processor. A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one IC chip is used. A representative example of this aspect is a system on chip. In addition, the system on chip can be referred to a SoC which is an abbreviation of System On a Chip. IC is an abbreviation of Integrated Circuit.

As described above, various processing units are configured using one or more of the various processors as a hardware structure. In addition, specifically, the hardware structure of the various processors is an electric circuit (circuitry) obtained by combining circuit elements such as semiconductor elements.

The technical scope of the invention is not limited to the scope according to the above-described embodiment. The configurations and the like in each embodiment can be appropriately combined between the embodiments without departing from the gist of the invention.

EXPLANATION OF REFERENCES

1: curve showing a change in the CT value in the artery over time
2: curve showing a change in the CT value in the portal vein over time
3: curve showing a change in the CT value in the liver over time
10: property analysis device
10A: property analysis device
12: CT image acquisition unit
14: contrast time phase estimation unit
16: region-of-interest extraction unit
18: property analysis unit
20: information output unit
22: selection unit
30: processor
32: computer-readable medium
32A: computer-readable medium
34: communication interface
36: input/output interface
38: bus
40: memory
40A: memory
42: storage
50: contrast time phase estimation program
52: region-of-interest extraction program
54: property analysis program
56: selection program
60: input device
62: display device
100: feature extraction network
102: feature vector of non-contrast
104: feature vector of arterial phase
106: feature vector of portal phase
108: feature vector of equilibrium phase
109: feature vector
110: feature data
111: feature data
111A: feature data
120: classification network
130: weight calculation network
200: medical information system
220: medical image processing device
230: modality
231: CT apparatus
232: MRI apparatus
233: ultrasound diagnostic apparatus
234: PET apparatus
235: X-ray diagnostic apparatus
236: X-ray fluoroscopy apparatus
237: endoscopic apparatus
240: DICOM server
244: electronic medical record system
246: viewer terminal
248: communication line
$I_1$: non-contrast CT image
$I_2$: arterial phase CT image
$I_3$: portal phase CT image
$I_4$: equilibrium phase CT image
$I_{IN}$: CT image
$t_1$: period corresponding to arterial phase
$t_2$: period corresponding to portal phase
$t_3$: period corresponding to equilibrium phase
$P_1$: CT image acquisition process
$P_2$: contrast time phase estimation process
$P_3$: property analysis process
$P_{31}$: property analysis process
$P_4$: information output process
$P_5$: selection process
$P_{51}$: selection process
$P_{101}$: feature extraction process
$P_{102}$: concatenation process
$P_{103}$: property analysis process
$P_{105}$: averaging process
$P_{106}$: weight calculation process
$P_{112}$: weighted averaging process
p: probability
$W_{ei}$: weight
S10~S18: each step of procedure of property analysis method

What is claimed is:

1. A medical image processing device comprising:
one or more memories that store a program to be executed by the one or more processors; and
one or more processors configured to execute commands of the program
to acquire a medical image generated by performing contrast imaging,
to estimate a contrast state of the medical images on a basis of an analysis of the medical image,
to perform a property analysis on a region of interest included in the medical image by a trained model using contrast state information indicating the contrast state of the medical image,
to extract feature amounts from the regions of interest included in the medical image for each contrast state, using the trained learning model,
to perform the property analysis on the regions of interest included in the medical images on the basis of feature data in which the feature amounts of the regions of interest for each contrast state are concatenated, and
to average some of the feature amounts of the regions of interest included in the medical images for each contrast state.

2. The medical image processing device according to claim 1,
wherein the one or more processors is configured to select the medical image having the contrast state information corresponding to a contrast state excluding non-contrast.

3. The medical image processing device according to claim 1,
wherein the one or more processors is configured to extract the region of interest from the medical image and perform the property analysis on the region of interest.

4. The medical image processing device according to claim 1,
wherein the one or more processors is configured to estimate the contrast state of the medical image using a trained learning model.

5. The medical image processing device according to claim 1, wherein the one or more processors is configured to:
extract the feature amounts from the regions of interest included in the medical images for each contrast state, using a feature extraction model that extracts the feature amounts from the regions of interest included in the medical images for each contrast state as the trained learning model, concatenate the feature amounts of the regions of interest for each contrast state, and perform the property analysis on the regions of interest included in the medical images, using a classification model that classifies the feature data in which the feature amounts of the regions of interest included in the medical images for each contrast state are concatenated as the trained learning model.

6. The medical image processing device according to claim 1, wherein the one or more processors is configured to:

calculate a weight for each of the feature amounts of the regions of interest included in the medical images for each contrast state, using a weight calculation model that calculates the weight used in a case in which a weighted average of the feature amounts of the regions of interest included in the medical images for each contrast state is calculated as the trained learning model.

7. The medical image processing device according to claim 1, wherein in a case in which some of the regions of interest included in the medical images for each contrast state are lost, the one or more processors is configured to use the region of interest included in the medical image of the contrast state, which has a similar feature amount to the region of interest included in the medical image of the lost contrast state, instead of the region of interest included in the medical image of the lost contrast state.

8. A method of operating a medical image processing device, the method comprising:

acquiring a medical image generated by performing contrast imaging, estimating a contrast state of the medical image on a basis of an analysis of the medical image, performing a property analysis on a region of interest included in the medical image by a trained model using contrast state information indicating the contrast state of the medical image, extracting feature amounts from the regions of interest included in the medical image for each contrast state, using the trained learning model, performing the property analysis on the regions of interest included in the medical images on the basis of feature data in which the feature amounts of the regions of interest for each contrast state are concatenated, and averaging some of the feature amounts of the regions of interest included in the medical images for each contrast state.

9. A non-transitory, computer-readable tangible recording medium which records thereon a program that causes, when read by a computer, the computer to implement:

acquiring a medical image generated by performing contrast imaging, estimating a contrast state of the medical image on a basis of an analysis of the medical image, performing a property analysis on a region of interest included in the medical image by a trained model using contrast state information indicating the contrast state of the first medical image, extracting feature amounts from the regions of interest included in the medical image for each contrast state, using the trained learning model, performing the property analysis on the regions of interest included in the medical images on the basis of feature data in which the feature amounts of the regions of interest for each contrast state are concatenated, and averaging some of the feature amounts of the regions of interest included in the medical images for each contrast state.

* * * * *